(12) United States Patent
Nonaka

(10) Patent No.: US 7,969,865 B2
(45) Date of Patent: Jun. 28, 2011

(54) NETWORK SYSTEM OF RECOVERING ROUTING INFORMATION

(75) Inventor: Naomichi Nonaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 587 days.

(21) Appl. No.: 11/802,543

(22) Filed: May 23, 2007

(65) Prior Publication Data

US 2008/0037426 A1 Feb. 14, 2008

(30) Foreign Application Priority Data

Aug. 10, 2006 (JP) .................................. 2006-217934

(51) Int. Cl.
 *G01R 31/08* (2006.01)
(52) U.S. Cl. ........................................ 370/216; 370/225
(58) Field of Classification Search .................... None
 See application file for complete search history.

(56) References Cited

U.S. PATENT DOCUMENTS

| | | | |
|---|---|---|---|
| 6,222,821 B1* | 4/2001 | Sees et al. ..................... | 370/227 |
| 7,257,739 B2* | 8/2007 | Quinlan ......................... | 714/43 |
| 7,317,731 B2* | 1/2008 | Seddigh et al. ............... | 370/419 |
| 7,359,377 B1* | 4/2008 | Kompella et al. ............. | 370/389 |
| 7,606,140 B2* | 10/2009 | Golla ............................ | 370/216 |
| 2007/0053359 A1* | 3/2007 | Wu et al. ....................... | 370/392 |
| 2007/0223922 A1* | 9/2007 | Nakata ........................... | 398/52 |
| 2008/0189353 A1* | 8/2008 | Gray et al. ..................... | 709/202 |

FOREIGN PATENT DOCUMENTS

JP 2003-318983 11/2003

OTHER PUBLICATIONS

Berger, L. "Generalized Multi-Protocol Label Switching (GMPLS) Signaling Resource ReserVation Protocol-Traffic Engineering (RSVP-TE) Extensions", Movaz Networks, Nctworking Group, Jan. 2003, pp. 1-42.

* cited by examiner

*Primary Examiner* — Kevin C Harper
*Assistant Examiner* — Rhonda Murphy
(74) *Attorney, Agent, or Firm* — Stites & Harbison PLLC; Juan Carlos A. Marquez, Esq.

(57) ABSTRACT

When protection processing is applied after a fault in the optical switching unit while the path control unit is restarting. In network systems comprising a path control unit for setting the paths, and a data transmission unit coupled to the path control unit; the data transmission unit changes the path information, stores path information before and after the fault was detected, and transmits the path information from before or after fault detection to the path control unit, and decides either of the transmitted path information based on an internal status; and the path control unit stores the path information sent from the data transmission unit, and after restarting, receives path information from the data transmission unit and, acquires path information stored in the path control units controlled by the adjacently connected data transmission units and is restored to operation with path information from before restarting.

10 Claims, 18 Drawing Sheets

BEFORE SEQUENCE 405

330

| SESSION ID | INPUT IF_ID | INPUT LABEL | OUTPUT IF_ID | OUTPUT LABEL | STATUS | OTHER ATTRIBUTE VALUES |
|---|---|---|---|---|---|---|
| SESSION_A | 1001 | 3100 | 1002 | NONE | IN USE | |
| SESSION_A | 1002 | NONE | 1001 | 3200 | IN USE | |
| SESSION_B | 1004 | 3400 | 1002 | NONE | RESERVED | |
| SESSION_B | 1002 | NONE | 1004 | 3200 | RESERVED | |

*FIG. 16A*

AFTER SEQUENCE 412

330

| SESSION ID | INPUT IF_ID | INPUT LABEL | OUTPUT IF_ID | OUTPUT LABEL | STATUS | OTHER ATTRIBUTE VALUES |
|---|---|---|---|---|---|---|
| - | 1001 | - | 1002 | - | RESTORING | |
| - | 1002 | - | 1001 | - | RESTORING | |
| - | 1004 | - | - | - | RESTORING | |
| - | - | - | 1004 | - | RESTORING | |

*FIG. 16B*

AFTER SEQUENCE 417 330

| SESSION ID | INPUT IF_ID | INPUT LABEL | OUTPUT IF_ID | OUTPUT LABEL | STATUS | OTHER ATTRIBUTE VALUES |
|---|---|---|---|---|---|---|
| - | 1001 | - | 1002 | - | RESTORING | |
| - | 1002 | - | 1001 | - | RESTORING | |
| SESSION_B | 1004 | 3400 | 1002 | NONE | RESERVED | |
| SESSION_B | 1002 | NONE | 1004 | 3200 | RESERVED | |

*FIG. 16C*

AFTER SEQUENCE 418 330

| SESSION ID | INPUT IF_ID | INPUT LABEL | OUTPUT IF_ID | OUTPUT LABEL | STATUS | OTHER ATTRIBUTE VALUES |
|---|---|---|---|---|---|---|
| SESSION_A | 1001 | 3100 | 1002 | NONE | IN-USE | |
| SESSION_A | 1002 | NONE | 1001 | 3200 | IN-USE | |
| SESSION_B | 1004 | 3400 | 1002 | NONE | RESERVED | |
| SESSION_B | 1002 | NONE | 1004 | 3200 | RESERVED | |

*FIG. 16D*

SWITCH STATUS CONTROL TABLE
BEFORE LINE FAULT OCCURS                    220A

| INPUT IF | OUTPUT IF | IF STATUS |
|----------|-----------|-----------|
| 1        | 2         | IN USE    |
| 2        | 1         | IN USE    |
| 3        | -         | NOT USED  |
| 4        | -         | NOT USED  |

FIG. 19A

SWITCH STATUS CONTROL TABLE
AFTER LINE FAULT OCCURS                     220A

| INPUT IF | OUTPUT IF | IF STATUS |
|----------|-----------|-----------|
| 1        | -         | IN FAULT  |
| 2        | -         | NOT USED  |
| 3        | -         | NOT USED  |
| 4        | -         | NOT USED  |

FIG. 19B

PRIOR TO SEQUENCE 605                                                  330

| SESSION ID | INPUT IF_ID | INPUT LABEL | OUTPUT IF_ID | OUTPUT LABEL | STATUS | OTHER ATTRIBUTE VALUES |
|---|---|---|---|---|---|---|
| SESSION_B | 1001 | 3100 | 1002 | 3400 | IN-USE | |
| SESSION_B | 1002 | 3200 | 1001 | 3300 | IN-USE | |

FIG. 20A

AFTER SEQUENCE 612                                                     330

| SESSION ID | INPUT IF_ID | INPUT LABEL | OUTPUT IF_ID | OUTPUT LABEL | STATUS | OTHER ATTRIBUTE VALUES |
|---|---|---|---|---|---|---|
| - | 1001 | - | 1002 | - | RESTORING | |
| - | 1002 | - | 1001 | - | RESTORING | |

FIG. 20B

AFTER SEQUENCE 617                                                     330

| SESSION ID | INPUT IF_ID | INPUT LABEL | OUTPUT IF_ID | OUTPUT LABEL | STATUS | OTHER ATTRIBUTE VALUES |
|---|---|---|---|---|---|---|
| SESSION_B | 1001 | 3100 | 1002 | - | RESTORING | |
| SESSION_B | 1002 | - | 1001 | 3300 | RESTORING | |

FIG. 20C

AFTER SEQUENCE 619                                                     330

| SESSION ID | INPUT IF_ID | INPUT LABEL | OUTPUT IF_ID | OUTPUT LABEL | STATUS | OTHER ATTRIBUTE VALUES |
|---|---|---|---|---|---|---|
| SESSION_B | 1001 | 3100 | 1002 | 3400 | IN USE | |
| SESSION_B | 1002 | 3200 | 1001 | 3300 | IN USE | |

FIG. 20D

NETWORK SYSTEM OF RECOVERING ROUTING INFORMATION

CLAIM OF PRIORITY

The present application claims priority from Japanese patent application JP 2006-217934 filed on Aug. 10, 2006, the content of which is hereby incorporated by reference into this application.

BACKGROUND OF THE INVENTION

This invention relates to a network system and in particular to fault recovery in communication control units.

When a fault occurs in the D-plane in a generalized multi-protocol label switching (GMPLS) network, the path is switched in the optical switching unit in order to restore operation, and the path setup is reported to GMPLS control device. In one proposed protection method, the GMPLS control device utilizes a GMPLS signaling protocol at this time to notify all control devices that the path was switched and restore operation (refer to JP 2003-318983 A).

In another proposed method called the Graceful Restart method, when restarting after a fault has occurred, the GMPLS control device receives preexisting path information from other adjacent nodes to restore the path status to restore operation without terminating a path (refer to L. Berger, "GMPLS RSVP-TE" RFC 3473, IETF, January 2003).

SUMMARY OF THE INVENTION

In the Graceful Restart procedure, when a fault occurs in the optical switching unit while the GMPLS control device is restarting, and protection processing starts, the preexisting path information sent from adjacent nodes does not match the configuration of the actual optical switching unit. This technology therefore has the problem that GMPLS control device fails to reconfigure the path information and cannot resume operation.

A representative aspect of this invention is as follows. That is, there is provided a network system comprising at least one set of a path control unit and a data transmission unit coupled to the path control unit, in which the path control unit sets a path for transmitting data by using a signaling protocol, in which the data transmission unit further comprises an input interface for receiving the transmitted data and an output interface for outputting the input data, in which the data transmission unit is configure to: send input data to data transmission unit which is directly coupled according to instruction sent from the path control unit; store path information including the relation between the input interface and the output interface; change the path information when a fault is detected on the path transmitting the data; store the path information before the fault is detected, and the path information after the fault is detected when a fault is detected while the path control unit is restarting; send one of the path information before the fault is detected and the path information after the fault is detected, to the path control unit; and select either of the path information to be sent based on the internal state set according to the communication status with the path control unit, and in which the path control unit is configure to: store the path information sent from the data transmission unit, receive the path information from the data transmission unit after the path control unit has restarted in a state where a valid path is set, and restore the path information before restarting, by acquiring the path information stored in the path control unit that controls to the directly coupled data transmission units.

This invention according to an embodiment is capable of fault recovery by first eliminating the mismatch in path status, then applying the protection processing when a fault has occurred in the IF of the optical switching unit while the GMPLS control device is restarting.

BRIEF DESCRIPTION OF THE DRAWINGS

The present invention can be appreciated by the description which follows in conjunction with the following figures, wherein:

FIG. 16A through FIG. 16D are drawings showing a status of the path status control table of the first embodiment of this invention;

FIG. 19A and FIG. 19B are drawings showing a status of the switch status control table of the second embodiment of this invention; and FIG. 20A through FIG. 20D are drawings showing a status of the path status control table of the second embodiment of this invention.

DETAILED DESCRIPTION OF THE PREFERRED EMBODIMENTS

Figure 1:
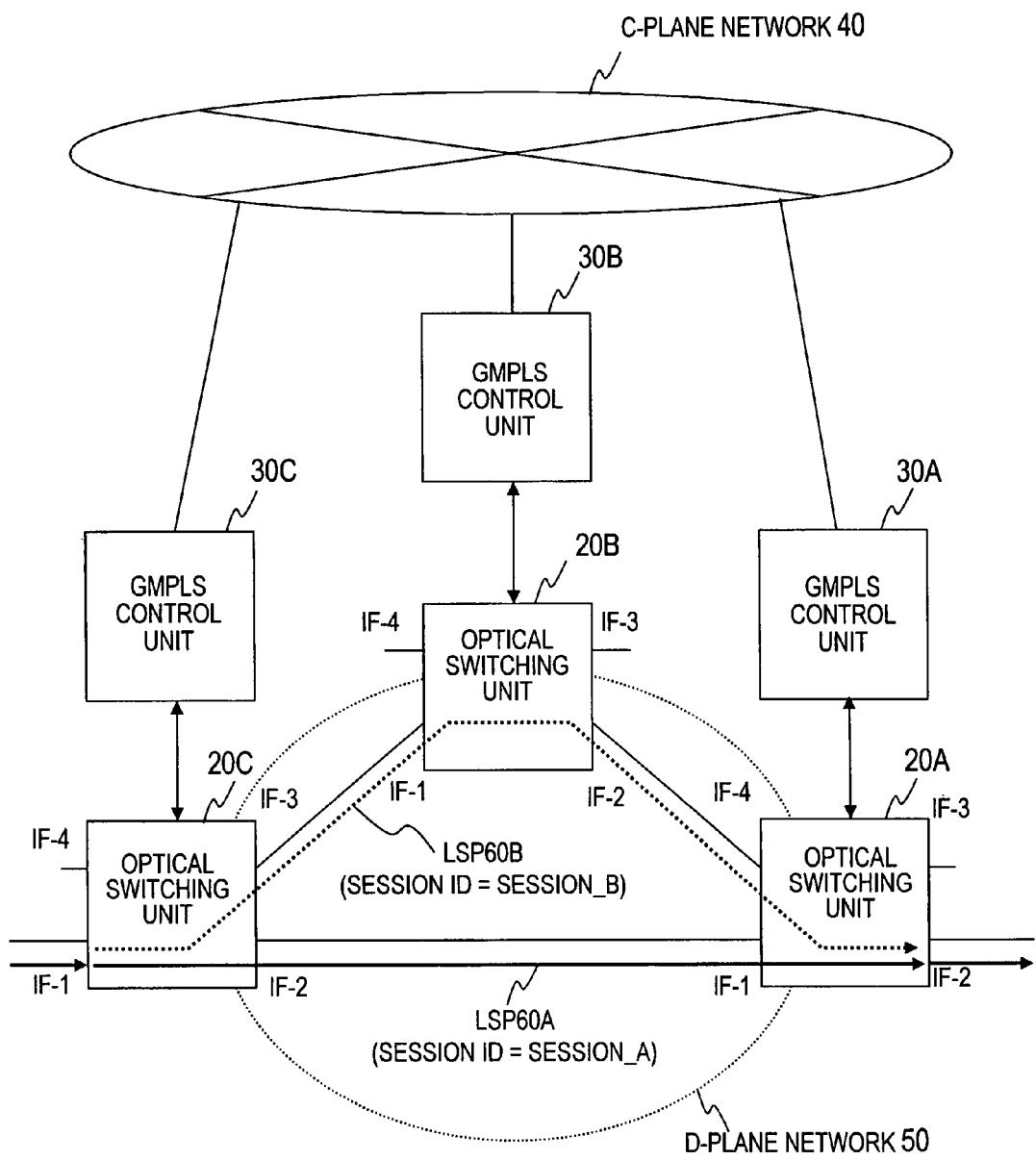
FIG. 1 is a block diagram showing a configuration of a network system of a first embodiment of this invention.

The embodiments of this invention are described next while referring to the drawings.

First Embodiment

FIG. 1 is a block diagram showing a configuration of a network system of the first embodiment of this invention. The network system of the first embodiment comprises an optical switching unit 20, a GMPLS control unit 30, a control plane (C-Plane) network 40, and a data plane (D-Plane) network 50. The optical switching unit 20 is an inclusive name for the optical switching units 20A, 20B, and 20C. The GMPLS control unit 30 is an inclusive name for the GMPLS control units 30A, 30B, and 30C.

A Label Switched Path (LSP) 60 is set in the D-Plane network 50. The LSP is a path that is set based on GMPLS label information.

The optical switching unit 20 changes paths of each optical signal per each light wavelength. The GMPLS control unit 30 communicates via the C-Plane network 40 based on GMPLS protocol, and performs LSP 60 settings, deletions and status changes. The GMPLS control unit 30 also sends the setting contents to the optical switch 20 and instructs that changes be made in the actual switching status. The switching status is the connection relationship between the input interface (IF) and the output interface IF path information in the optical switching unit 20.

The optical switching units 20 and the GMPLS control units 30 are described as three sets of devices corresponding one-to-one, however an optional number of these devices may be installed as needed. Moreover the optical switching units 20 and the GMPLS control units 30 need not always correspond one-to-one to each other, and one of the GMPLS control unit 30 may control multiple optical switching units 20. The optical switching units 20 and the GMPLS control units 30 can also be mounted in the different cabinets or mounted in the same cabinet.

The C-Plane network 40 is a packet network utilizing IP protocol. The D-Plane network 50 is a collection of data lines connecting between interfaces in the optical switching units 20.

When all optical switching units 20 on the D-Plane network 50 are connected to a data line capable of direct communication, these linked optical switching units 20 are defined as mutually adjacent. Moreover if the optical switching units 20 for control are mutually adjacent, then the GMPLS control units 30 need not be connected by a direct communication line, and can be a network made up of logical adjacent connections such as linking via the C-Plane network 40.

The first embodiment utilizes optical wavelength switches as network switches but other switching units utilizing other network switches such as TDM and packets specified for GMPLS may also be utilized unchanged.

The LSP 60 in the D-Plane network 50 is a logical path defined as a path from a particular interface to another interface and connecting to one or more data lines. The LSP 60 is defined as two LSP including the LSP 60A and the LSP 60B and in FIG. 1 is a path from IF-1 in the optical switching unit 20C to IF-2 in the optical switching unit 20A. The LSP 60A is a path via IF-2 of optical switching unit 20C and via IF-1 of optical switching unit 20A. The LSP 60B in the same way is a path from the IF-3 of optical switching unit 20C, via IF-1 and IF-2 of optical switching unit 20B, and via IF-4 of optical switching unit 20A.

Figure 2:
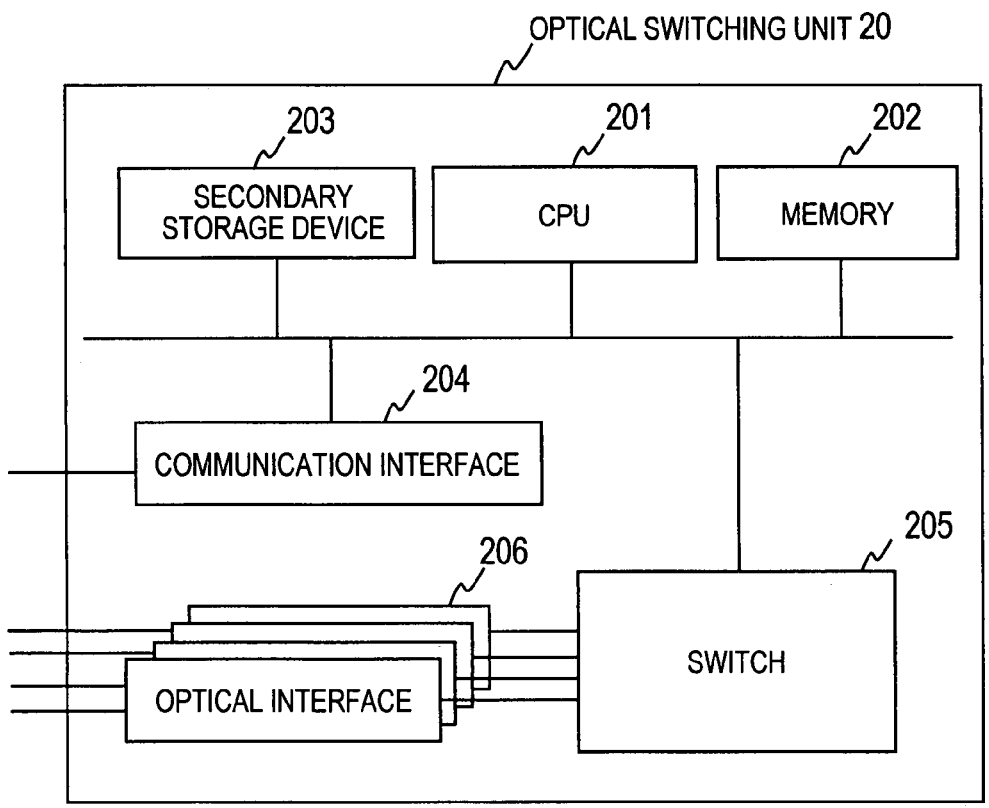
FIG. 2 is a block diagram showing a configuration of an optical switching unit of the first embodiment of this invention.

FIG. 2 is a block diagram showing a configuration of the optical switching unit 20 of the first embodiment of this invention. The optical switching unit 20 includes a CPU 201, a memory 202, a secondary storage device 203, a communication interface 204, a switch 205, and an optical interface 206.

The CPU 201 executes the programs stored in the memory 202. The memory 202 stores data required for processing and for program executed by the CPU 201. The secondary storage device 203 stores setup files and software for controlling the optical switching unit 20.

The communication interface 204 is an interface for connecting to external sections, and also connects to the GMPLS control unit 30. The first embodiment can be implemented by installing one communication interface 204 but multiple communication interfaces 204 may also be installed.

The switch 205 functions to cluster the optical signals. The optical interface 206 is an interface connecting the optical fibers. The optical interface 206 is for IF-1 through IF-4 of the optical switching units 20A, 20B, and 20C in FIG. 1.

Figure 3:
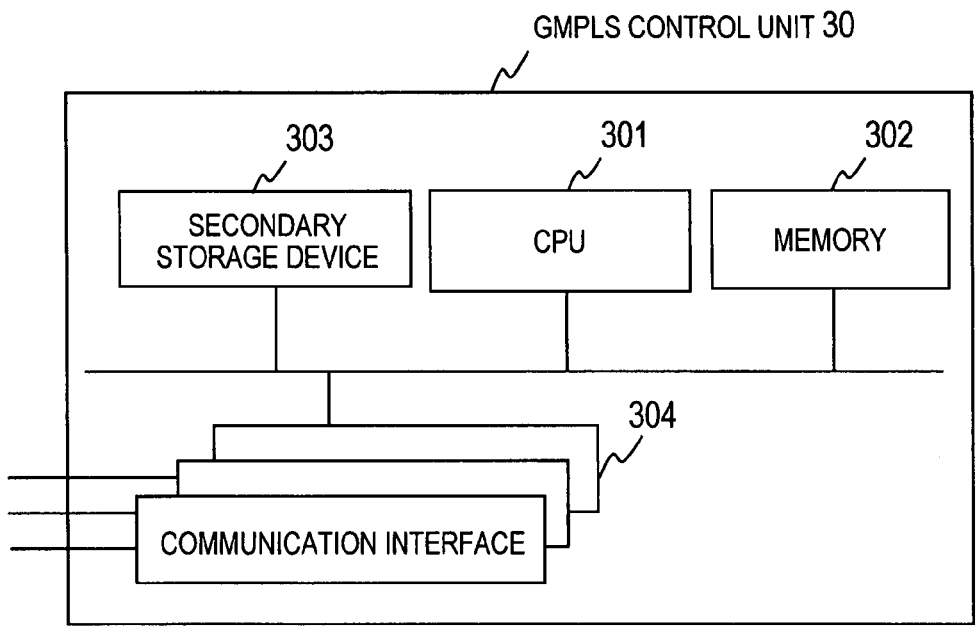
FIG. 3 is a block diagram showing a configuration of a GMPLS control unit of the first embodiment of this invention.

FIG. 3 is a block diagram showing a configuration of the GMPLS control unit 30 of the first embodiment of this invention. The GMPLS control unit 30 includes a CPU 301, a memory 302, a secondary storage device 303, and a communication interface 304.

The CPU 301 executes programs stored in the memory 302. The memory 302 stores data required for processing and for program executed by the CPU 301. The secondary storage device 303 stores software and setup files, etc.

The communication interface 304 is an interface for connecting to external sections, and also connects to the optical switching unit 20. The first embodiment can be implemented by one communication interface 304 but multiple communication interfaces 304 may also be installed.

An overview of the processing sequence for recovery from a D-Plane line fault in the network of the first embodiment is described next. In the first embodiment, data communication is assumed to be data input from the IF-1 of optical switching unit 20C and output from IF-2 of optical switching unit 20A.

The LSP 60A and the LSP 60B used for input from IF-1 of optical switching unit 20C, and output from IF-2 of optical switching unit 20A are shown in FIG. 1. In the first embodiment, the LSP 60A is the primary path, and the LSP 60B is the secondary path, and communication is usually performed via the LSP 60A. In the case a fault occurs in the LSP 60A, data communication is switched to the secondary path via the LSP 60B by switching the settings in each optical switching unit 20.

The optical switching unit 20 detects faults in the data lines. The optical switching unit 20 also performs the task of switching paths. Changes in the LSP status on the other hand, are made by the GMPLS control unit 30 based on GMPLS protocol. There are two types of fault recovery methods and these functions by a sequence for changing the LSP state and the switching paths. One is a restoration method that first changes the LSP status under guidance from the GMPLS control unit; and the other is a protection scheme that first switches paths under guidance from the optical switching unit.

The protection method, switches the paths by internal processing in the optical switching unit 20. In the restoration method however, the optical switching unit 20 first notifies the GMPLS control unit 30 that there is a data line fault, and the optical switching unit 20 then switches the path according to instructions from GMPLS control unit 30. The protection method is therefore capable of recovering from faults at high speed compared to the restoration method. However, the LSP status is monitored by the GMPLS control unit 30 so in some cases the LSP status might differ from the actual switching status in the protection method.

Mismatches between the LSP status and the actual switch status are gradually eliminated when the GMPLS control unit 30 is operating correctly. However, cases sometimes occur where the mismatch between the LSP status and the actual switch status cannot be eliminated due to cases where the GMPLS control unit 30 cannot operate correctly for some reason, such as when a fault has occurred in the GMPLS control unit 30, or the software for the GMPLS control unit 30 is being updated.

The first embodiment however can recover from these dual-layer faults of data line faults and the GMPLS control unit faults by utilizing the protection method to retain the pre-path switching state and the post-path switching state in the optical switching unit 20 and, change the reply to the subsequent switch status enquiry from the GMPLS control unit 30 according to whether the path switching was reported as successful or not to the GMPLS control unit 30.

The first embodiment utilizes RSVP-TE as a path setting protocol among the GMPLS control units, and utilizes Graceful Restart processing as specified in RFC 3473 as the procedure for restoring the path states when the GMPLS control unit is restarting. This invention also applies in the same way even when other path setting protocols are being utilized.

Figure 4:
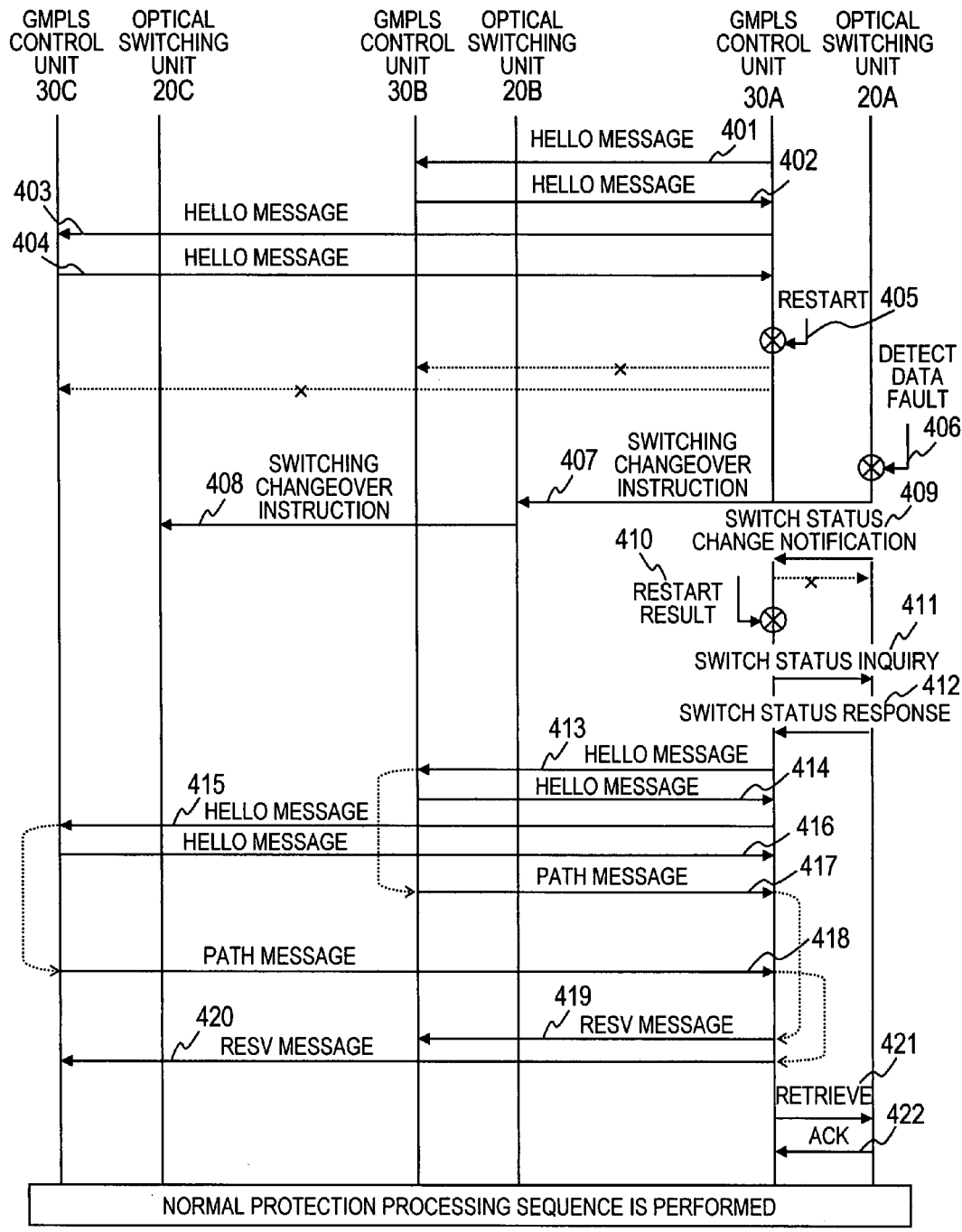
FIG. 4 is a sequence diagram showing a recovery processing of the first embodiment of this invention.

FIG. 4 is a sequence diagram showing the recovery processing of the first embodiment of this invention when a dual-layer fault made up of a data line fault and the GMPLS control fault has occurred. FIG. 4 shows the GMPLS control unit 30A recovery sequence when the optical switching unit 20A detects a fault in the IF-1 during restarting of the GMPLS control unit 30A, and switches the path from the LSP 60A to the LSP 60B.

The GMPLS control units 30A, 30B and 30C mutually exchange Hello messages and periodically confirm that operation is correct (401 through 404).

When the GMPLS control unit 30A begins restarting (405), the GMPLS control units 30B and 30C are unable to receive Hello messages from the GMPLS control unit 30A for a fixed time or longer (time-out occurs). The GMPLS control units 30B and 30C then decide that a fault has occurred in the GMPLS control unit 30A or between the C-Plane network 40 and the GMPLS control unit 30A. The GMPLS control units 30B and 30C then stop updating the path information via the GMPLS control unit 30A, and start protecting the path information.

The optical switching unit 20A then switches from the currently used LSP 60A to the LSP 60B, after it detects an optical data line fault in the IF-1 (406). More specifically, the optical switching unit 20A sends a switching changeover instruction via the D-Plane network 50 to the optical switching unit 20B and the optical switching unit 20C (407 and 408). The optical switching unit 20B and the optical switching unit 20C switch the path from the LSP 60A to the LSP 60B when they receive the switching changeover instruction to recover from the data communications fault.

The optical switching unit 20A notifies the GMPLS control unit 30A that the switch status has been changed (409) but the GMPLS control unit 30A is currently restarting so there is no reply. The optical switching unit 20A therefore decides that some type of fault has occurred in the GMPLS control unit 30A, and the internal status of optical switching unit 20A set to "Hold".

After restarting is then completed (410), the GMPLS control unit 30A sends a switch status query (411) to the optical switching unit 20A. The internal status of optical switching unit 20A at this time is in "Hold", so it sends the pre-switching LSP 60A status, rather than the status after switching to LSP 60B (412).

The time-out time for deciding a fault has occurred in the GMPLS control unit 30A varies according to the device structure but in the first embodiment is assumed to be approximately 15 milliseconds. The time from detecting the data fault to the optical switching unit sending the switching changeover instruction is estimated as approximately 50 milliseconds. Moreover, the time from the GMPLS control unit 30A beginning restarting until completing restarting is estimated as being from a few to several dozen seconds.

The GMPLS control unit 30A starts path status recovery based on the response results of the switch state sent by the optical switching unit 20A. The GMPLS control unit 30A then sends a Hello message set with parameter values showing status recovery is in progress, to the adjacently connected GMPLS control unit 30B and 30C (413 and 415).

The GMPLS control unit 30B and 30C that received this Hello message, again start exchanging Hello messages (414 and 416), and send PATH messages containing information needed for status recovery to the GMPLS control unit 30A. An LSP routed through the GMPLS control unit 30A is set in both the adjacently connected GMPLS control units 30B and 30C in the first embodiment so that PATH messages from both the GMPLS control units 30B and 30C are sent to the GMPLS control unit 30A (417 and 418).

After receiving the PATH messages, the GMPLS control unit 30A performs path state recovery based on the content of the received messages. The GMPLS control unit 30A then sends RESV messages to the adjacently connected GMPLS control units 30B and 30C to notify them that path recovery has been completed (419 and 420). The GMPLS control units 30B and 30C then decide through receiving these RESV messages from the GMPLS control unit 30A where status recovery is in progress, that the path status recovery was completed. The GMPLS control units 30B and 30C then stop protecting the path status and shift to the usual processing tasks.

When status recovery of all paths is complete, the GMPLS control units 30A then sends retrieve instruction to the optical switching unit 20A in order to cancel the hold status (421). The optical switching unit 20A then complies with the instruction and changes the internal status to normal status, and sends a confirmation response to the GMPLS control unit 30A (422).

The above process completes restoration of the switch status stored in the GMPLS control unit 30A with no conflicts with the GMPLS control units 30B and 30C switch status or with the actual switch status. This process is then followed by the normal protection processing sequence.

The subsequent protection processing sequence is described next. The GMPLS control unit 30 where the optical switching unit fault has occurred, first of all sends a path switching instruction to change to an secondary path from the primary path, to the adjacently connected optical switching units. This communication is the messages 407 and 408 in FIG. 4. The optical switch unit 20 at this time notifies the GMPLS control unit 30 only that the path has been changed.

The GMPLS control unit 30 then communicates with the optical switching unit 20 for control, rewrites the internally stored path status, and ensures data uniformity.

Messages exchanged between the GMPLS control units 30 in the sequence shown in FIG. 4 are the same as the Graceful Restart procedure described in RFC 3473. These exchanged messages contain no changes relative to the implementation of this invention so a detailed description is omitted.

The information stored in the optical switching unit 20 and the GMPLS control unit 30 utilized in the path recovery procedure of the first embodiment is described next.

Figure 5:
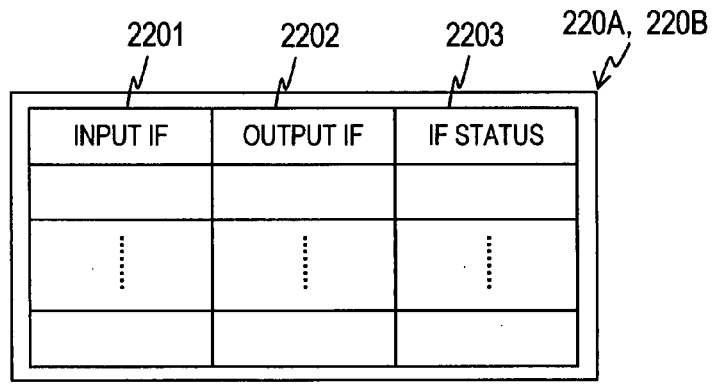
FIG. 5 is a configuration diagram showing a switch status control table of the first embodiment of this invention.

FIG. 5 is a configuration diagram showing the structure of a switch status control table 220 of the first embodiment of this invention. The memory 202 of the optical switching unit 20 stores the switch status control table 220. The optical switching unit 20 includes a switch status control table 220A for showing the status of the operating switch 205, and the save switch status control table 220B for showing the switch status before the path switching. The switch status table 220A and 220B are the same structure.

The switch status control table 220 includes an input IF field 2201, an output IF field 2202, and an IF status field 2203.

The input IF field 2201 stores the IF numbers for the input of the switch 205. The output IF field 2202 stores the IF numbers for the output of the switch 205. The IF status field 2203 stores the IF status specified by the input IF field 2201.

The IF states are four defined states including, "Not Used" "In Use" "Reserved" and "In Fault". Here, the state "Not Used" indicates that the applicable IF is not being utilized. The state "In Use" indicates a state where the applicable IF is connected to an output IF. The state "Reserved" indicates a state where a path was set to route the applicable IF for uses such as an secondary path to switch to during a fault. However, "Reserved" actually indicates a state where the input IF and the output IF are not connected by the switch 205. The state "In Fault" indicates a fault has occurred in the applicable input IF and communication is impossible. The output IF field 2202 value is ignored in all states except where the value stored in IF state field 2203 is "In Use".

Figure 6:
FIG. 6 is a configuration diagram showing a switching unit internal state control table of the first embodiment of this invention.

FIG. 6 is a configuration diagram showing the structure of the switching unit internal state control table 230 of the first embodiment of this invention. This switching unit internal state control table 230 is information stored in the memory 202 of optical switching unit 20.

The switching unit internal state control table 230 stores the internal status of the optical switching unit 20. A "Normal" state and a "Hold" state are defined as the internal states. In the "Hold" state, the GMPLS control unit 30 is notified of changes in the switch 205 state but the GMPLS control unit 30 is in a state where it cannot receive notification. The "Normal" state is the state other than the "Hold" state.

Figure 7:
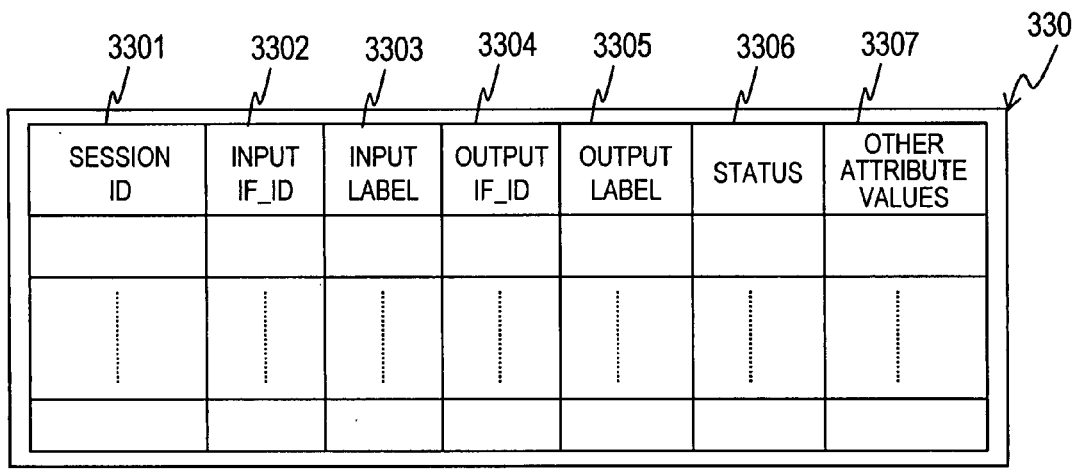
FIG. 7 is a configuration diagram showing a path status control table of the first embodiment of this invention.

FIG. 7 is a configuration diagram showing the structure of the path status control table 330 of the first embodiment of this invention. The memory 302 of GMPLS control unit 30 stores the path status control table 330. The path status control table 330 holds the path status set by the GMPLS protocol.

The path status control table 330 includes a session ID field 3301, an input IF_ID field 3302, an input label field 3303, an output IF_ID field 3304, an output label field 3305, a status field 3306, and other attribute value field 3307.

The session ID field 3301 stores session ID values used for identifying paths in the RSVP-TE protocol.

The input IF_ID field 3302 and the input label field 3303 respectively store the input IF_ID values and label values. The output IF_ID field 3304 and the output label field 3305 respectively store the output IF_ID values and the label values.

An IF_ID and a label are concepts for abstracting, unifying and handling switches of various transmission systems defined in the GPMPLS protocols. The IF_ID of the first embodiment is a numerical value for specifying the optical interface 206 of the optical switching unit 20. The label is a numerical value for specifying the wavelength of optical data inputted and outputted through the optical interface 206 of the optical switching unit 20. The IF_ID and the label values are numerical values, set individually by each GMPLS control unit 30 and reported to the adjacently connected GMPLS control units 30. These IF_ID and label values have no physical correspondence (such as numerical values expressing a light wavelength in nanometers), and are used only for decisions on whether values match or not.

In RSVP-TE, the GMPLS control units 30 for controlling the applicable interface decides the IF_ID values. The label values on the other hand, are decided by GMPLS control units 30 on the downstream side, or namely the side that receives the data, namely the downstream side. In the previous field, the GMPLS control unit 30 therefore decides the values stored in the input IF_ID field 3302, the input label field 3303, and the output IF_ID field 3304. Moreover, values reported from the other adjacent-connected GMPLS control unit 30 on the downstream side are stored in the output label field 3305.

The status of each path is stored in the status field 3306. Path status is defined as the three types, "In Use", "Reserved", and "In Recovery". In the "In Use" status, the GMPLS control units 30 set the applicable path, and "In Use" is a status where by each optical switching unit 20 sets the switch 205 according to the applicable path setting. In the "Reserved" status on the other hand, the individual GMPLS control unit 30 sets the applicable path, but the switch 205 is not set by the optical switching units 20. The "In Recovery" status indicates that recovery of the path status is currently in progress in compliance with Graceful Restart procedures.

The other attribute value field 3307 stores the different types of path information specified in RSVP-TE such as information required in protection processing. Values specified in RSVP-TE are also stored in the other attribute value field 3307 and there is no particular need to change them in implementing this invention so a detailed description is omitted.

The processing sequence for the optical switching units 20 and the GMPLS control units 30 is shown next utilizing a flowchart.

Figure 8:
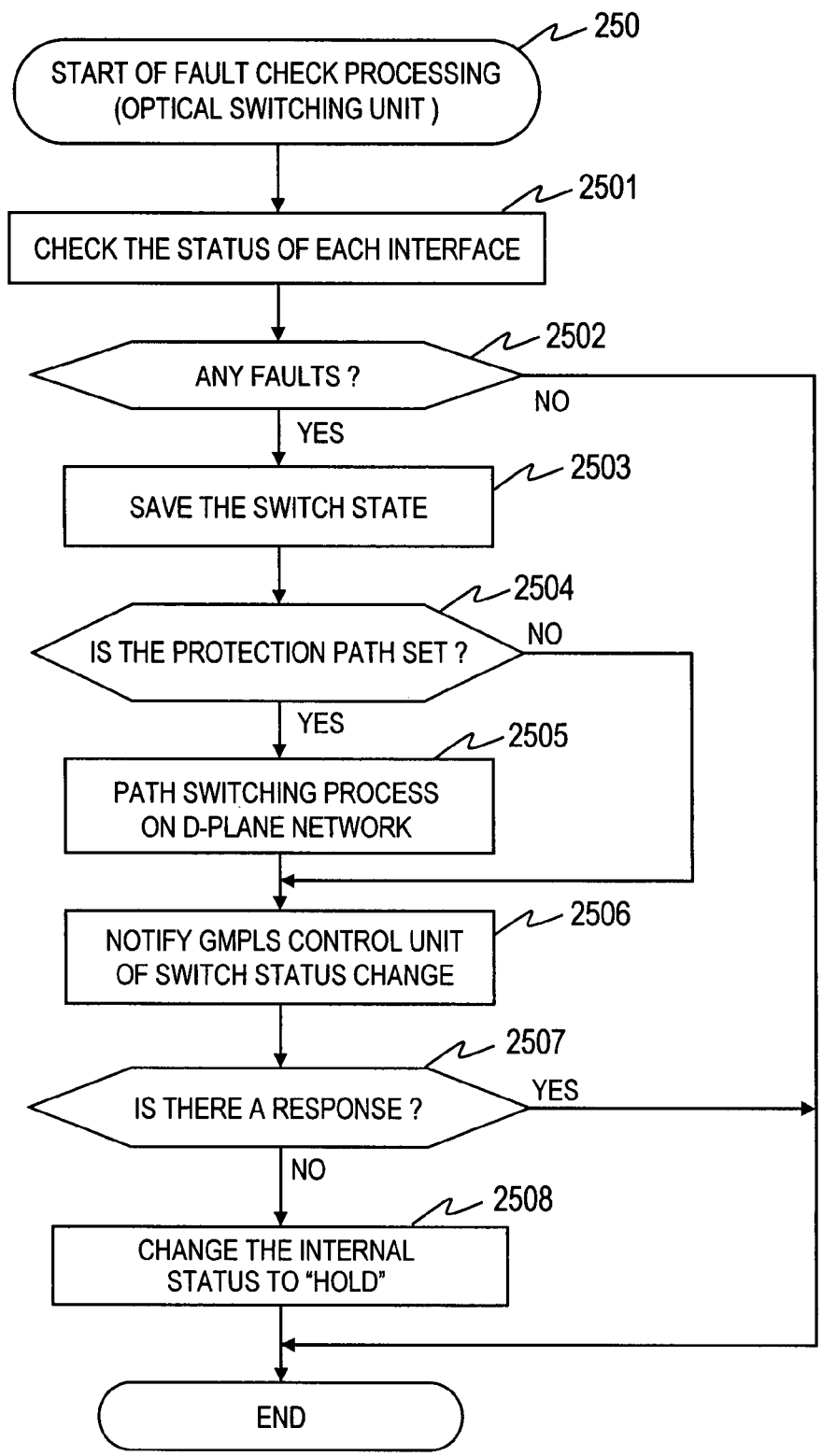
FIG. 8 is a flowchart showing a procedure for a check processing of the optical switching unit of the first embodiment of this invention.

FIG. 8 is a flowchart showing the procedure for a check processing 250 executed by the optical switching unit of the first embodiment of this invention. The CPU 201 of optical switching unit 20 executes the optical switching unit fault check processing 250 periodically.

The optical switching unit 20 first of all makes a check of the status of each optical interface 206 (2501). The optical switching unit 20 then decides if a fault has occurred or not (2502), and if no fault has occurred (result for 2502 is "No") terminates the processing.

On the other hand, if a fault has occurred (result for 2502 is "Yes", 406 in FIG. 4), then the optical switching unit 20 copies the contents of the switch status control table 220A into the switch status control table 220B, to save the switch status (2503).

The optical switching unit 20 next confirms whether a protection path was set or not via the interface where the fault occurred (2504). The protection path is a substitute path for performing communication when a fault has occurred. In the first embodiment, this protection path is equivalent to LSP 60B serving as an secondary path.

When a protection path has been set (result for 2504 is "Yes"), then the optical switching unit 20 executes the path switching process on the D-plane network 50 (407 and 408 in FIG. 4, 2505). In order to switch the path, path switching process on the D-plane network 50 sends a path switching changeover instruction directly to the optical switching unit 20, according to the pre-established protection path, and not via the GMPLS control unit 30. When the path switching process is complete, the switch status control table 220A is updated to reflect the status after path switching.

The optical switching unit 20 next notifies the GMPLS control unit 30 (409 in FIG. 4, 2506) that the switch status was changed via the communication interface 204. The optical switching unit 20 then decides whether or not a reply came back from the GMPLS control unit 30 within a fixed amount of time (2507). If there was a reply from the GMPLS control unit 30 (result for 2507 is "Yes"), then the processing is terminated. If there was no reply from the GMPLS control unit 30 (result for 2507 is "No"), then the value in the switching unit internal state control table 230 is changed to "Hold" (2508) and this processing terminates.

Figure 9:
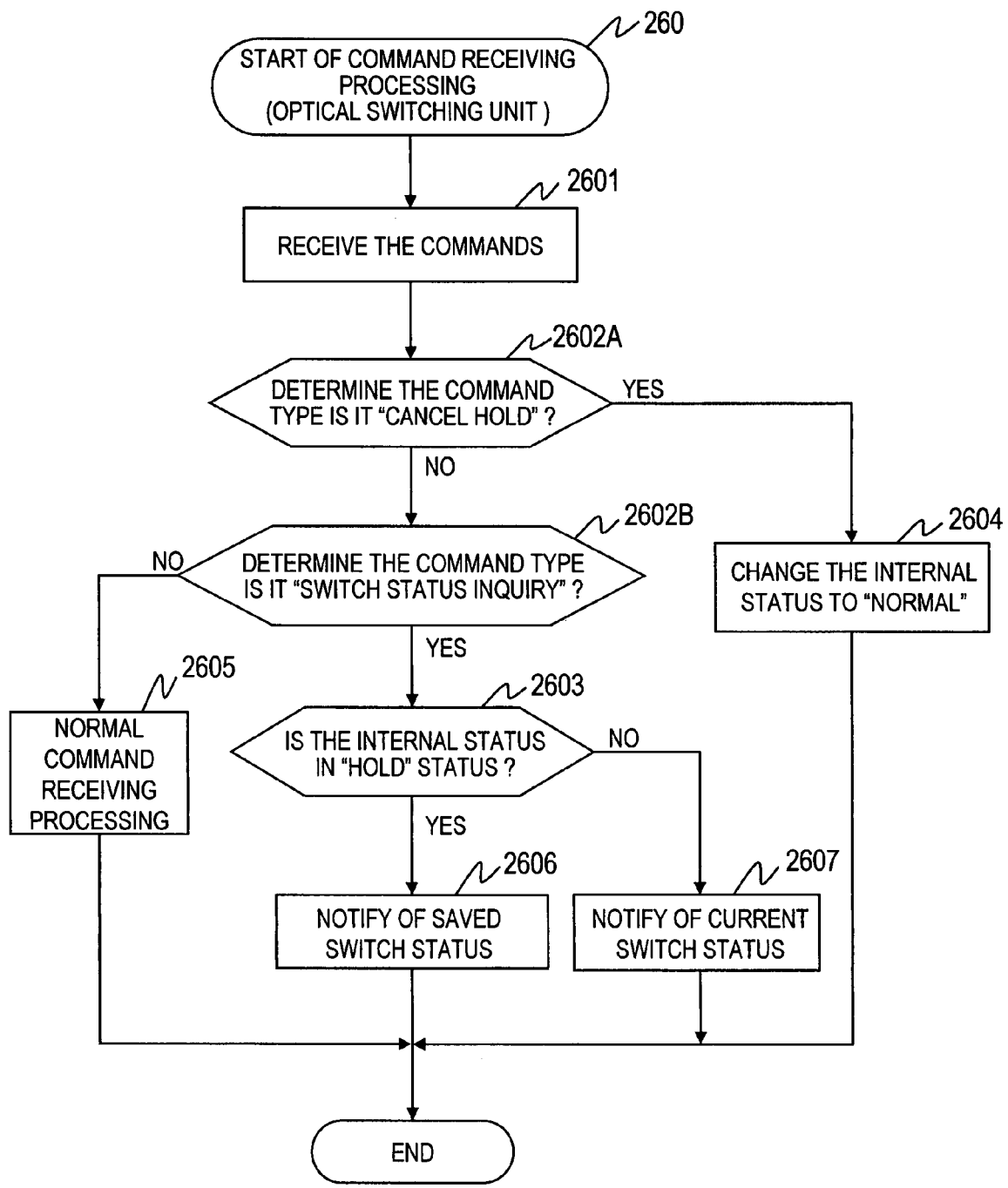
FIG. 9 is a flowchart showing a procedure for a command reception processing of the optical switching unit of the first embodiment of this invention.

FIG. 9 is a flowchart showing a procedure for a command reception processing 260 executed by the optical switching unit of the first embodiment of this invention. The CPU 201 of optical switching unit 20 executes the optical switching unit command reception 260. The optical switching unit 20 executes the optical switching unit command reception 260 after receiving a command sent from the GMPLS control unit 30.

The optical switching unit 20 first of all receives a command via the communication interface 204 (2601). The optical switching unit 20 then decides if the command type is "Retrieve" or not based on the command that was received (2602A). If the command type is "Retrieve" (result for 2602A is "Yes") then the path status of GMPLS control unit 30 has recovered so the value in switching unit internal state control table 230 of optical switching unit 20 is changed from "Hold" to "Normal" status (421 in FIG. 4, 2604).

On the other hand, if the received command type was not "Retrieve", then the optical switching unit 20 (result for 2602A is "No") decides whether or not the command type is "Switch Status Enquiry" (2602B).

If the received command type was "Switch Status Enquiry" (411 in FIG. 4, result for 2602B is "Yes") then the optical switching unit 20 decides whether the value in switching unit internal state control table 230 of the optical switching unit 20 is the "Hold" status or not (2603).

If the value in switching unit internal state control table 230 is "Hold" status (result for 2603 is "Yes"), then the optical switching unit 20 notifies the command transmit source of the contents of the switch status control table 220B serving as the saved status, in order to restore the GMPLS control unit 30 path status to the status before restarting of the GMPLS control unit 30 (412 in FIG. 4, 2606). On the other hand, when the value in switching unit internal state control table 230 is not "Hold" status (result for 2603 is "No"), then the optical switching unit 20 notifies that command's transmit source of the contents of the switch status table 220A serving as the current switch status (2607).

When the received command type is not "Retrieve" or "Switch Status Enquiry" (result for 2602B is "No"), then the optical switching unit 20 implements processing according to the received command (2605).

The procedure for processing executed by the optical switching unit 20 was described above. The procedure for processing executed by the GMPLS control unit 30 is described next.

Figure 10:
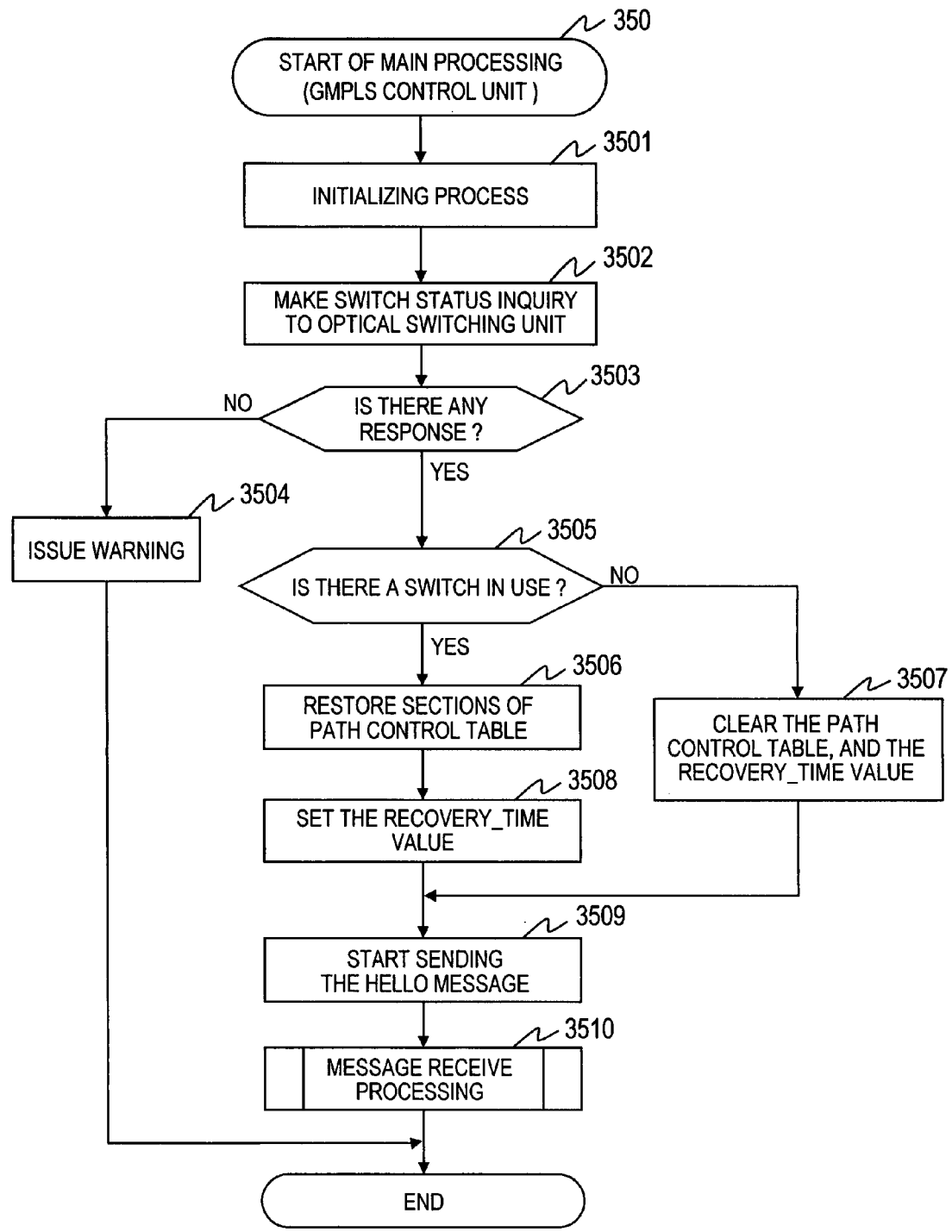
FIG. 10 is a flowchart showing a procedure for a main processing of the GMPLS control unit of the first embodiment of this invention.

FIG. 10 is a flowchart showing a procedure for a main processing 350 executed by the GMPLS control unit of the first embodiment of this invention. The CPU 301 of GMPLS control unit 30 executes the main process 350 of the GMPLS control unit. The main process 350 of the GMPLS control unit starts up when the usual power supply is turned on, restarts due to the occurrence of some type of fault, and is also executed at times such as scheduled restarts when the program is upgraded, etc.

The GMPLS control unit 30 first of all, performing initialization (3501), makes an inquiry via the communication interface 304 to the optical switching unit 20 about the switch status (411 in FIG. 4, 3502). The GMPLS control unit 30 then decides if there is a reply to the inquiry to the optical switching unit 20 (3503). If there was no reply within a specified time (result for 3503 is "No") then the GMPLS control unit 30 decides a fault has occurred in the optical switching unit 20, warns the system administrator (3504), and terminates the process.

If there is a reply from the optical switching unit 20 (412 in FIG. 4, result for 3503 is "Yes"), then the GMPLS control unit 30 decides whether or not there is a switch in use in the received switch status (3505).

If there is no switch in use in the received switch status (result for 3505 is "No"), then there is no need to restore the path, so the GMPLS control unit 30 clears the contents of the path status control table 330, and sets the Recovery_time value to 0 (3507). This Recovery_time value is a value specified in the RFC 3473, and the time up until completion of restarting is set here. Therefore if the Recovery_time value is 0, then initialization begins without restarting.

If there is a switch in use among the received switch status (result for 3505 is "Yes"), then the GMPLS control unit 30 partially restores the path status control table 330. More specifically, the GMPLS control unit 30 rewrites the input IF_ID3302 and the output IF_ID3304 values for the paths being restored based on the received switch status, and sets the status field 3306 value to "In Recovery". The GMPLS control unit 30 also sets the required value in the Recovery_time value in order to restore the path status (3508).

The GMPLS control unit 30 sends a Hello message to the adjacently connected GMPLS control units 30 (413 and 415 in FIG. 4, 3509). The Hello message sent at this time includes parameters showing that the path status is currently being restored. The GMPLS control unit 30 then receives a reply to the Hello message sent to the adjacently connected GMPLS control units 30 (414 and 416 in FIG. 4) and also executes the RSVP message reception (3510). The RSVP message is a message sent separately by the adjacently connected GMPLS control unit 30 from the reply to the Hello message containing parameters showing the path status is currently being restored. Detailed information on the RSVP message receive procedure is described later on in FIG. 11.

Figure 11:
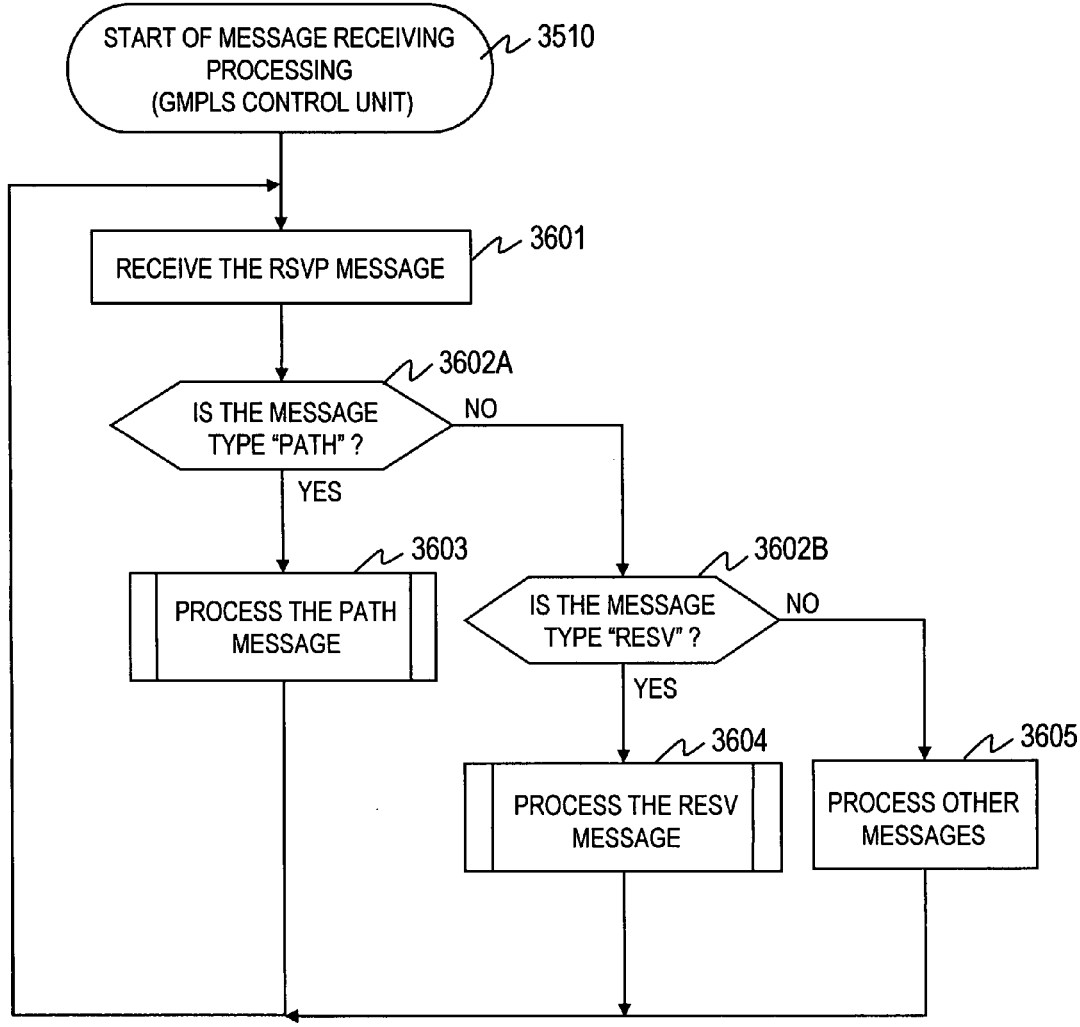
FIG. 11 is a flowchart showing a procedure for a message reception processing of the GMPLS control unit of the first embodiment of this invention.

FIG. 11 is a flowchart showing a procedure for message reception processing 3510 executed by the GMPLS control unit of the first embodiment of this invention.

The GMPLS control unit 30 receives the RSVP message sent via the communication interface 304 from the other GMPLS control unit 30 (3601). The GMPLS control unit 30 then decides whether the message type of the received RSVP message is "PATH" or not (3602A).

When the message that was received is a PATH message (417, 418 in FIG. 4, result for 3602A is "Yes"), the GMPLS control unit 30 executes the PATH message process (3603). Detailed information on the PATH message process is described later on in FIG. 12.

However, when the received message is not a PATH message, (result for 3602A is "No"), then the GMPLS control unit 30 decides whether or not the received message is an RESV message (3602B). If the received message is an RESV message (419, 420 in FIG. 4, result for 3602B is "Yes"), then the GMPLS control unit 30 implements a RESV message processing (3604). Detailed information on the RSVP message process is described later on in FIG. 13.

When the RSVP message that was received is a message other than a PATH message or RESV message (result for 3602B is "No") then the GMPLS control unit 30 implements processing according to the message it received (3605). The processing for the 3605 process does not differ from that of the related art so a detailed description is omitted here.

The PATH message and the RESV message processing is described next. In order to set a path by utilizing RSVP protocols in the first embodiment, the GMPLS control unit 30 first of all sends a PATH message from the start point node to the end point node. When the end point node receives a PATH message, it sends an RESV message towards the start point node. The start point node then completes the path setting in the procedure by receiving the RESV message. Therefore, even in the path recovery process, the status can be restored by a procedure utilizing PATH messages from the upstream node and the RESV messages from the downstream node.

Figure 12:
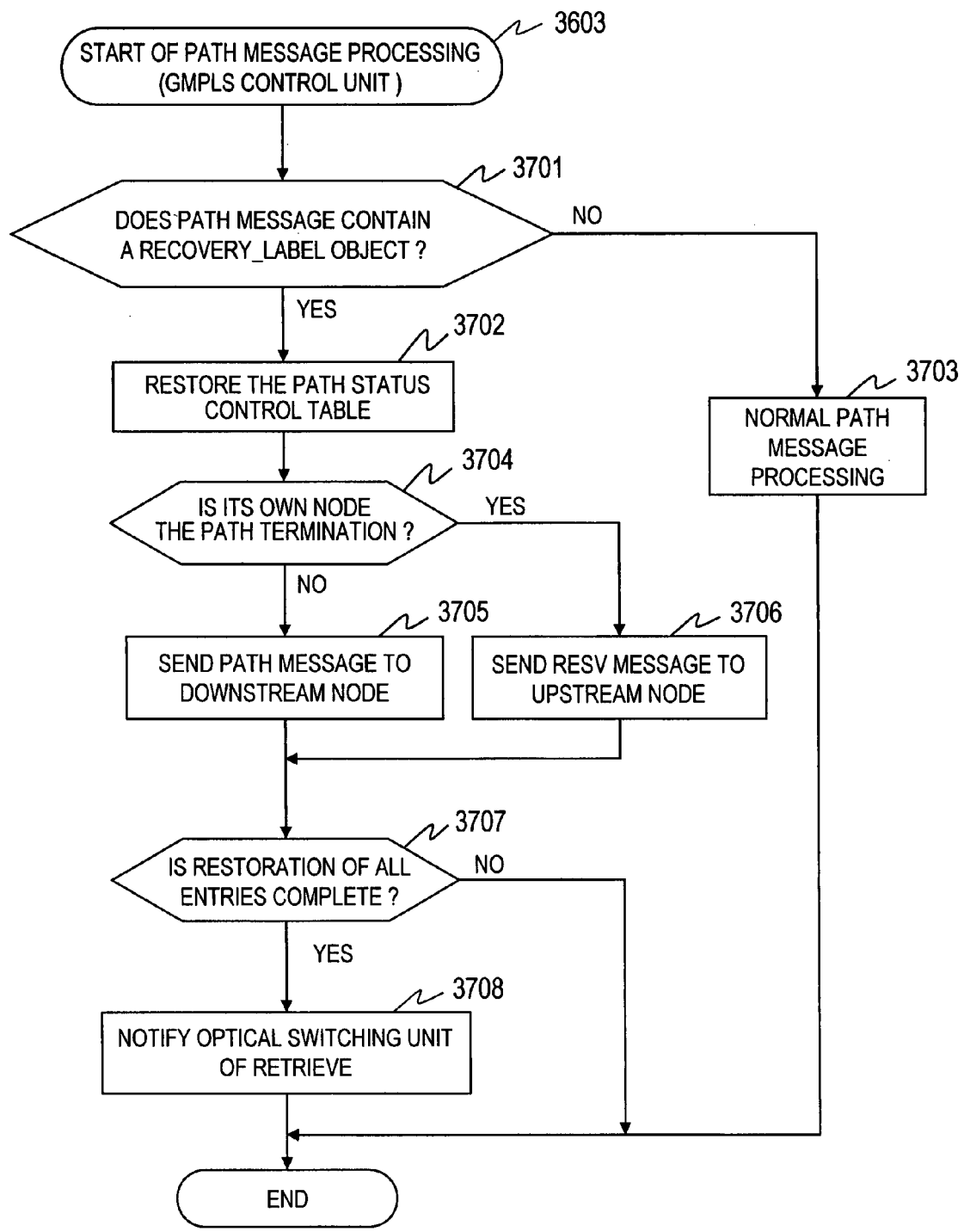
FIG. 12 is a flowchart showing a procedure for a PATH message processing of the GMPLS control unit of the first embodiment of this invention.

FIG. 12 is a flowchart showing a procedure for PATH message processing 3603 executed by the GMPLS control unit of the first embodiment of this invention. The CPU 301 of GMPLS control unit 30 executes the GMPLS control unit PATH message process 3603.

The GMPLS control unit 30 first of all decides whether or not there is a RECOVERY_LABEL object in the PATH message (3701). The PATH message is utilized when setting new paths and when restoring paths after a fault. The GMPLS control unit 30 decides whether or not there is a PATH message to restore the path status, by deciding if the received PATH message contains a RECOVERY_LABEL object or not. Detailed information on the RECOVERY_LABEL object is specified in RFC 3473.

If there is no RECOVERY_LABEL object in the PATH message (result for 3701 is "No") then the GMPLS control unit 30 executes the normal PATH message processing since there is no message for restoring the path status of the received PATH message (3703).

On the other hand, when the PATH message contains no RECOVERY_LABEL object (417, 418 in FIG. 4, result for 3701 is "Yes"), the GMPLS control unit 30 executes processing to restore the path status.

More specifically, the GMPLS control unit 30 first of all, restores the path status control table 330 based on the contents of the received PATH message (3702). In entries where all fields for a path have been restored at this time, the value in status field 3306 is changed from "In Recovery" to the original status. In entries where all fields have not been restored, the status field 3306 value remains as "In Recovery".

The GMPLS control unit 30 next decides whether its own node is the path termination or not (3704). When its own node is the path termination (result for 3704 is "Yes"), then the GMPLS control unit 30 sends an RESV message to the upstream node (3706). When its own node is not the path termination (result for 3704 is "No"), then the GMPLS control unit 30 sends a PATH message to the downstream node (3705).

The GMPLS control unit 30 next decides whether restoring of all entries of the path status control table is complete or not (3707). If not completed (result for 3707 is "No"), then the process is terminated. If restoring of all entries of the path status table was completed (result for 3707 is "Yes"), then the GMPLS control unit 30 notifies the optical switching unit 20 of the retrieve command (3708), and terminates the process.

Figure 13:
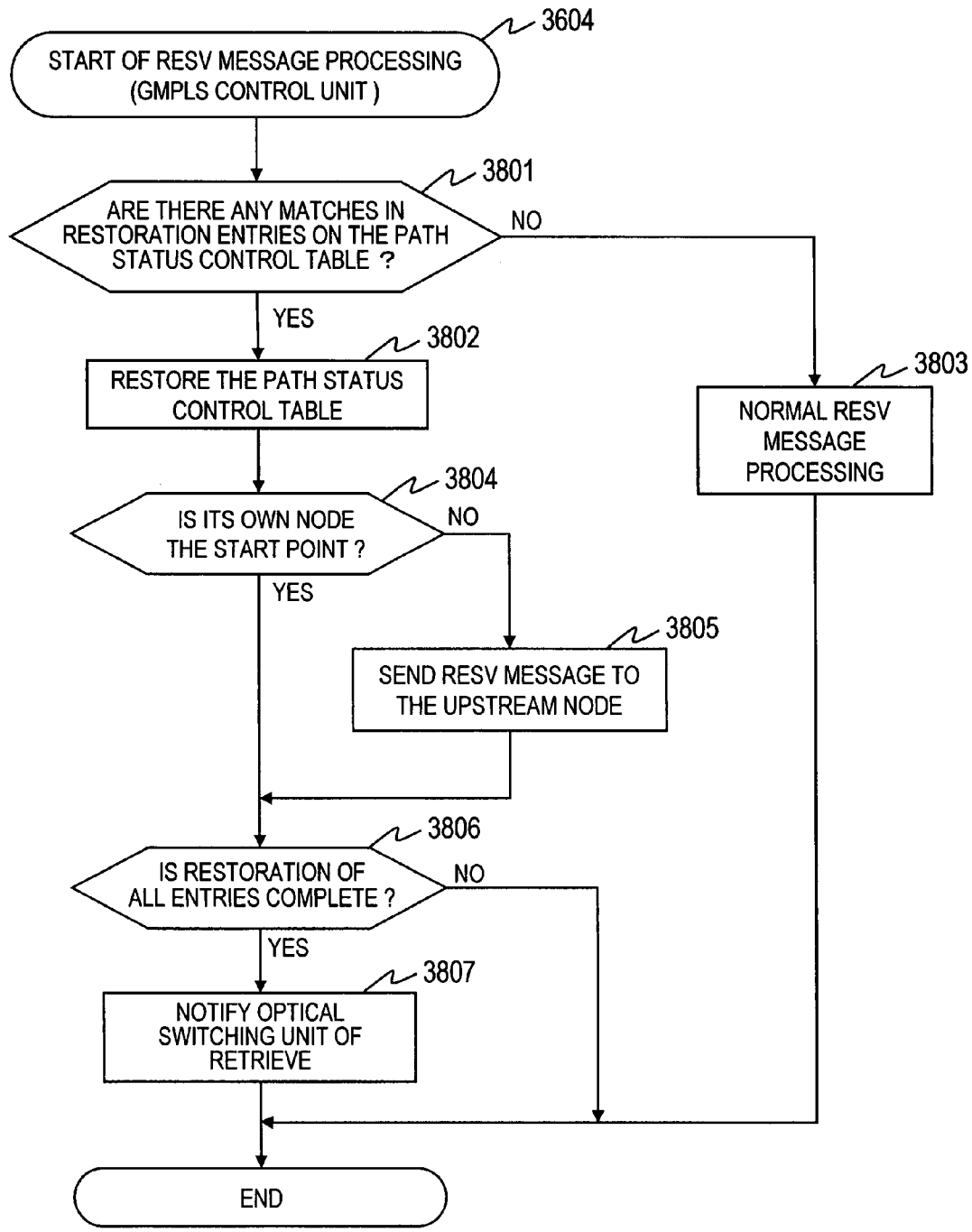
FIG. 13 is a flowchart showing a procedure for a RESV message processing of the GMPLS control unit of the first embodiment of this invention.

FIG. 13 is a flowchart showing a procedure for the RESV message processing 3604 of the GMPLS control unit of the first embodiment of this invention. The CPU 301 of GMPLS control unit 30 executes the RESV message process 3604 of the GMPLS control unit.

The GMPLS control unit 30 decides whether or not there are matches in the received RESV message for entries where the status field 3306 value in path status control table 330 is "In Recovery" (3801). The RESV message contains no information such as the RECOVERY_LABEL object in the PATH message that allows identifying those messages that are for restoring the path status, and therefore the GMPLS control unit 30 makes the decision by whether the session ID values match or not.

If there are no entries in the path status control table 330 matching the received RESV message (result for 3801 is "No"), then the GMPLS control unit 30 executes the normal RESV message processing (3803).

However, when there is an entry in the path status control table 330 matching the received RESV message (419 or 420 in FIG. 4, result for 3801 is "Yes"), then the GMPLS control unit 30 executes the path status recovery processing. More specifically, the GMPLS control unit 30 restores the contents of the path status control table 330 based on the contents of the received RESV message (3802). Then, the same as in the process for 3702 in FIG. 12, for entries where all information of the path has been restored, the status field 3306 "In Recovery" value is changed back to the original value. The status field 3306 value remains "In Recovery" for those entries where restoring of all fields has not been completed.

The GMPLS control unit 30 next decides whether its own node is the path start point or not (3804). If not the path start point (result for 3804 is "Yes"), then the RESV message is sent to the upstream node (3805).

The GMPLS control unit 30 further decides whether restoring of all entries for the path status control table was completed or not (3806). If restoration of all entries was not completed (result for 3806 is "No"), then the process is terminated. If restoration of all entries was completed (result for 3806 is "Yes"), then the GMPLS control unit 30 notifies the optical switching unit 20 of the retrieve command (3807) and the process terminates.

Figure 14:
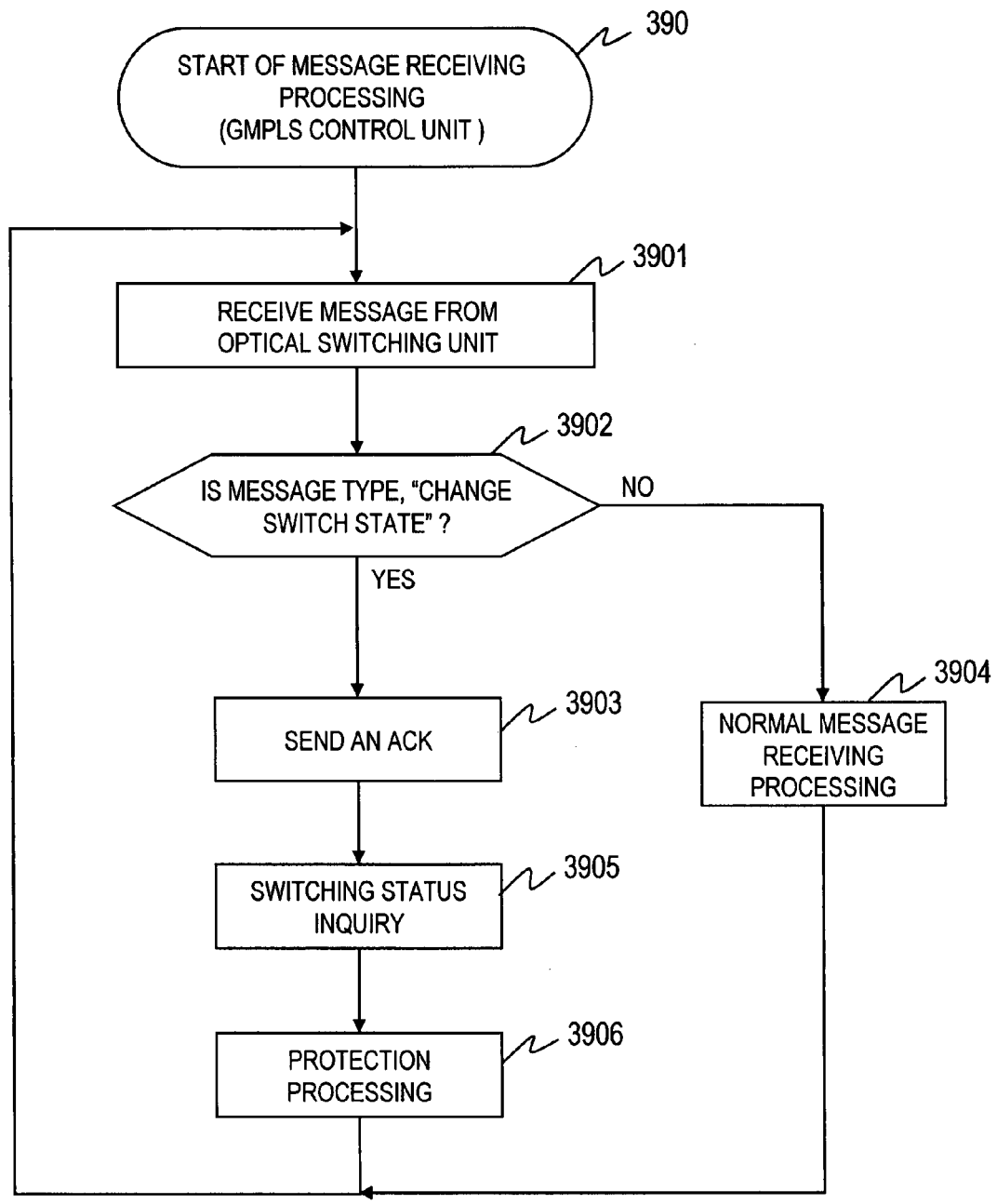
FIG. 14 is a flowchart showing a procedure for a message receiving processing of the GMPLS control unit of the first embodiment of this invention.

FIG. 14 is a flowchart showing a procedure for a message receiving processing 3900, the message being sent from the optical switching unit, executed by the GMPLS control unit of the first embodiment of this invention. The CPU 301 of GMPLS control unit 30 executes message reception 390 in the GMPLS control units and optical the switching units.

The GMPLS control unit 30 receives the message transmitted from the optical switching unit 20 via the communication interface 304 (3901). The GMPLS control unit 30 decides whether the type of the received message is "Change switch state" or not (3902). If the received message type is not "Change switch state" (result for 3902 is "No") then processing is executed according to the received message (3904).

If the received message type is "Change switch state" (result for 3902 is "Yes"), then the GMPLS control unit 30 sends an ACK to the optical switching unit 20 (3903). The GMPLS control unit 30 then makes an inquiry about the switch status to the optical switching unit 20 (3905). The GMPLS control unit 30 then executes the protection processing based on the switch status in the reply from the optical switching unit 20 (3906).

The processing executed by the optical switching unit 20 and the GMPLS control unit 30 were described above. Next, a specific example of restoring the path status according to the above processing procedure is described while referring to the drawings.

Figure 15A:
FIG. 15A and FIG. 15B are drawings showing a status of the switch status control table of the first embodiment of this invention.
Figure 15B:
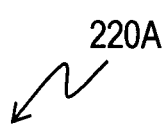

FIG. 15A and FIG. 15B are drawings showing the content of the switch status control table 220 for the optical switching unit 20A of the first embodiment of this invention. FIG. 15A shows the status before data fault detection (prior to 406 in FIG. 4). FIG. 15B shows the status after data fault detection (after 406 in FIG. 4).

Referring to FIG. 15A, the IF-1 and the IF-2 are connected before fault detection. Therefore, the IF status is "In Use" for both of the IF-1 and the IF-2. In the status shown in FIG. 15A, communication is via the LSP 60A serving as the primary path shown in FIG. 1. In the IF-4 used on the LSP 60B serving as the secondary path, the IF state is set to "Reserved".

Here, when a fault occurs in the IF-1, the IF-1 status is changed from "In Use" to "In Fault" as shown in FIG. 15B. The secondary path IF-4 status is changed from "Reserved" to "In Use" in order to switch the path from LSP 60A to LSP 60B.

FIG. 16A through FIG. 16D are drawings showing the content of the path status control table 330 of the GMPLS control unit 30A of the first embodiment of this invention. The IF_ID value in FIG. 16 is a value where 1000 is added to the input IF value in FIG. 15 of the first embodiment.

FIG. 16A shows the path status control table 330 before restarting of the GMPLS control unit 30 A (prior to 405 in FIG. 4). Since no fault has occurred in IF-1 of the optical switching unit 20A before restarting of the GMPLS control unit 30A, the SESSION_A for the currently operating LSP 60A and SESSION_B for the currently reserved LSP 60B are stored as shown in FIG. 16A. More specifically, SESSION_A utilizes input interface as IF-1, and the output interface as IF-2. The SESSION_B utilizes the input interface as IF-4, and the output interface as IF-2.

FIG. 16B shows the path status control table 330 that was restored based on the switching status received from the inquiry to the optical switching unit 20A (after 412 in FIG. 4).

After restarting is complete, the GMPLS control unit 30A utilizes the initialization 3501 of a main process 350 of the GMPLS control unit to clear the path status control table 330. The GMPLS control unit 30A then makes an inquiry to the optical switching unit 20A about the switch status (3502 in FIG. 10, 411 in FIG. 4), and receives the switch status (412 in FIG. 4). The GMPLS control unit 30A then rewrites the path status control table 330 based on the switch status that was received (3506 in FIG. 10).

At this time, the optical switching unit 20A switches paths from the LSP 60A to the LSP 60B since a fault has occurred in the IF-1 (2505 in FIG. 8, and 407 and 408 in FIG. 4). Also, since no response is received to the switch status change notification that optical switching unit 20 sent to the GMPLS control unit 30A (2506 in FIG. 8, 409 in FIG. 4), the internal status of optical switching unit 20A remains in "Hold" status (2508 in FIG. 8). So when the GMPLS control unit 30A has sent a switch status enquiry (411 in FIG. 4) to the optical switching unit 20A, the switch status that is received (412 in FIG. 4) is the switch status before the switch status is updated (2606 in FIG. 9). Therefore the actual switch status received by the GMPLS control unit 30A is the switch status shown in FIG. 15A. The state shown in FIG. 16B reflects the received switch status.

FIG. 16C shows the path status control table 330 that was restored based on the PATH message sent by the GMPLS control unit 30B (after 417 in FIG. 4).

The GMPLS control unit 30A sends a Hello message containing parameters showing that restoration is in progress to the GMPLS control unit 30B (3509 in FIG. 10, 413 in FIG. 4), and receives a PATH message from the GMPLS control unit 30B (3510 in FIG. 10). This received PATH message contains the path status before restarting, in order to follow the normal Graceful Restart procedure. The GMPLS control unit 30A rewrites the path status control table 330 (3702 in FIG. 12) based on the path status received before restarting. The GMPLS control unit 30B sends the path status for SESSION_B, so that the path status of SESSION_B is restored as shown in FIG. 16C.

FIG. 16D is a drawing showing the path status control table 330 that was restored based on the PATH message received from the GMPLS control unit 30C (after 418 in FIG. 4).

The GMPLS control unit 30A restores the path status control table 330 based on the PATH message received from the GMPLS control unit 30C. The GMPLS control unit 30A can utilize the PATH message that was received to restore the path status of an un-restored SESSION_A since it contains the path status for SESSION_A and SESSION_B. When the above processing is complete, the contents of the control table 330 are the path status shown in FIG. 16D and match the contents in FIG. 16A.

Restoring the path status control table 330 in the above procedure achieves conformance with the actual path information. Moreover, the usual protection processing ensures that the optical switching unit 20 and the GMPLS control unit 30 mutually conform to each other.

The invention according to the first embodiment is capable of restoring the path status without conflicts by utilizing Graceful Restart and protection processing even in cases where a fault has occurred in the IF of the optical switching unit while the GMPLS control unit 30 is restarting. Moreover, the invention of the first embodiment does not require a high-priced hot standby method.

The invention of the first embodiment is not limited just to cases where a fault occurs in the GMPLS control unit 30 but may also apply to cases where restarting was caused by a reason other than a fault, such as upgrading of software, so the embodiment can in this way help limit management costs.

Second Embodiment

Figure 17:
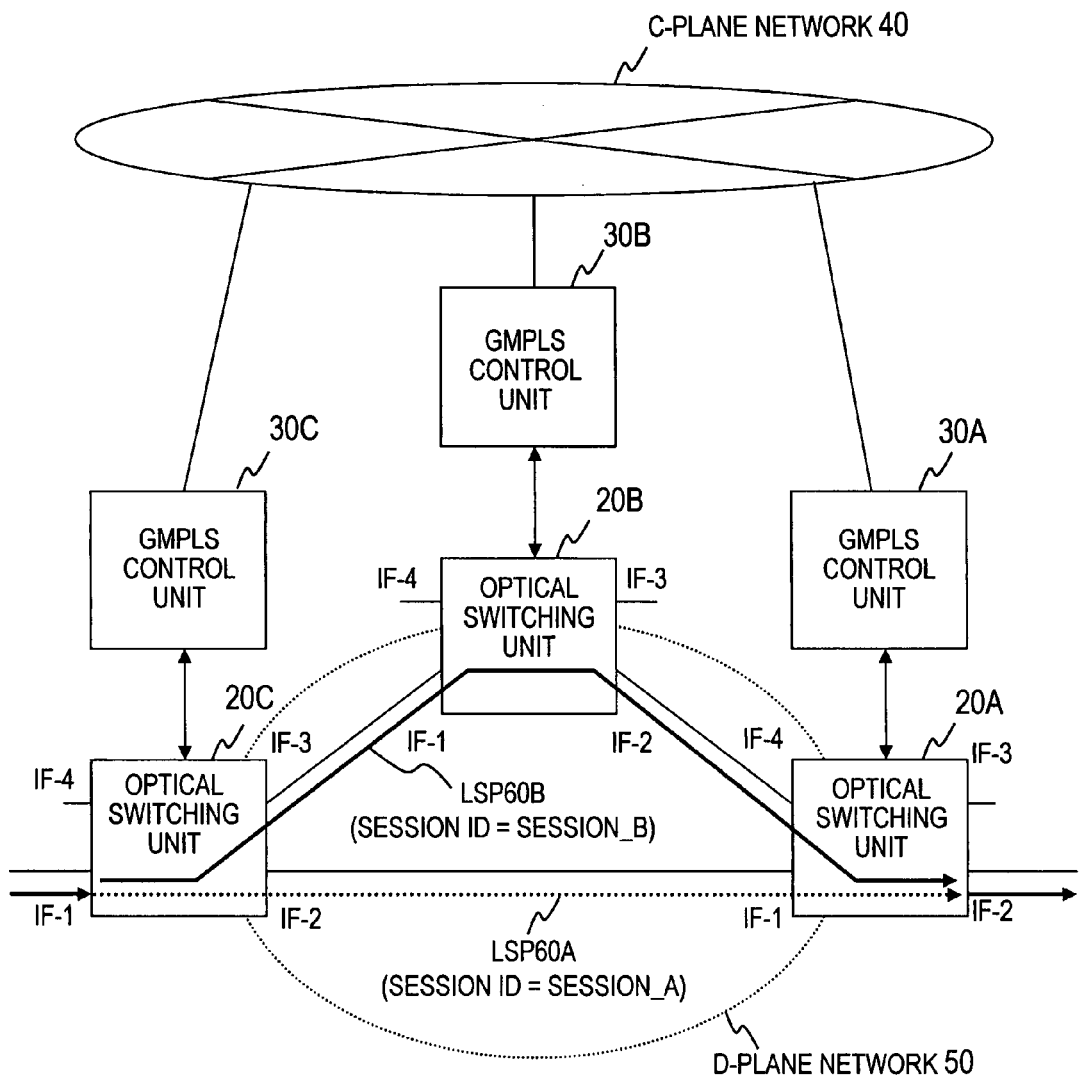
FIG. 17 is a block diagram showing a configuration of a network system of a second embodiment of this invention.

FIG. 17 is a block diagram showing a configuration of a network system of a second embodiment of this invention. The hardware and software structure of the second embodiment is identical to that of the first embodiment. The point differing from the first embodiment is that the LSP 60B is the primary path, and the LSP 60A is the secondary path. In the second embodiment, the optical switching unit 20B switches the data path from the LSP 60B to the LSP 60A when a fault occurs in the data line between the optical switching unit 20C and the optical switching unit 20B, while the GMPLS control unit 30B is restarting.

Figure 18:
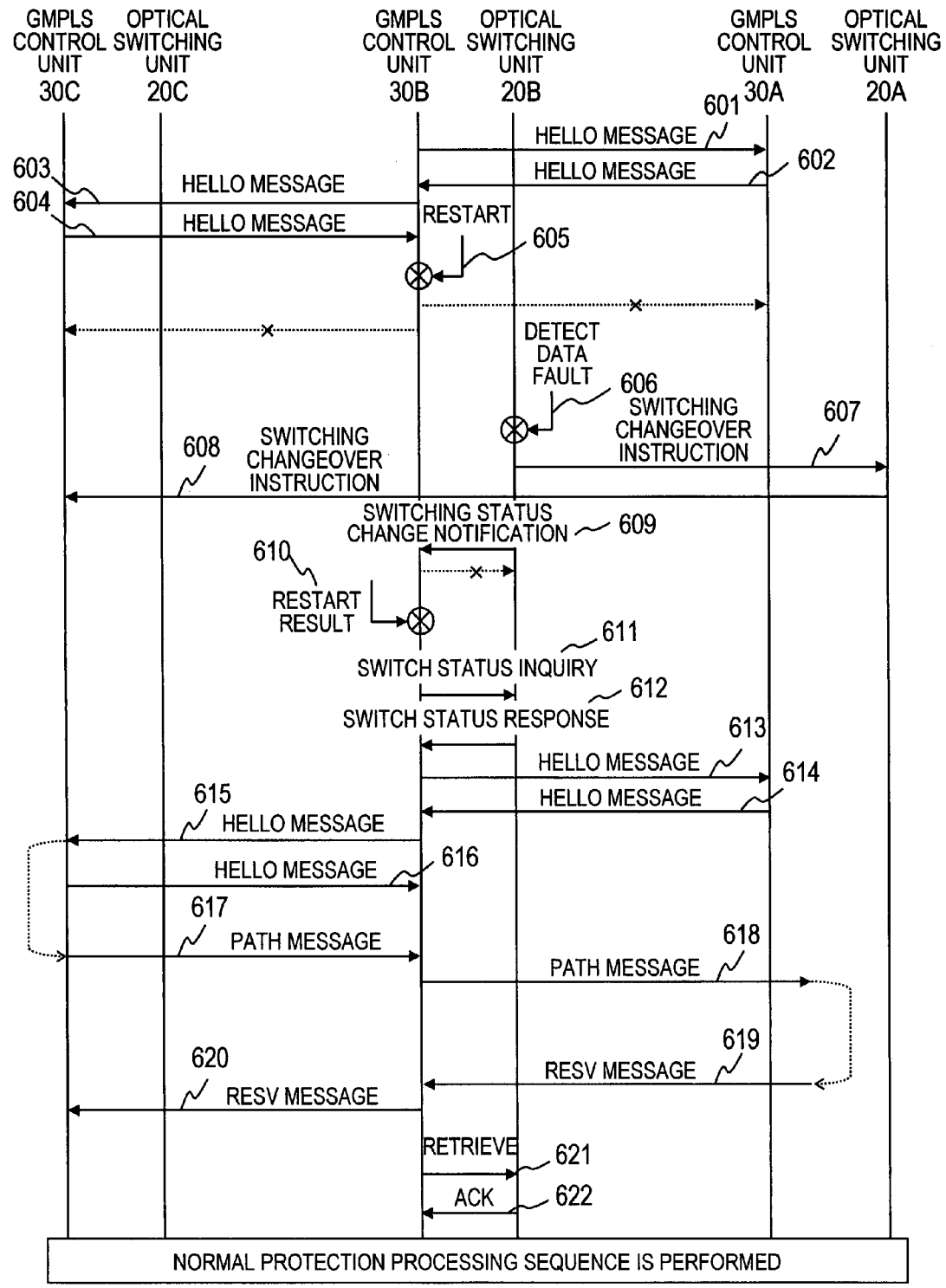
FIG. 18 is a sequence diagram showing the restoration procedure of the second embodiment of this invention.

FIG. 18 is a sequence diagram showing the restoration procedure when double faults such as a data line fault and a GMPLS control unit fault have occurred of the second embodiment of this invention. The GMPLS control units 30A, 30B and 30C mutually exchange Hello messages the same as in the first embodiment and periodically confirm that operation is correct (601 through 604).

The GMPLS control units 30A and 30C are unable to receive Hello messages from the GMPLS control units 30B for a specified time or longer, when the GMPLS control units 30B is restarting (605). The GMPLS control units 30A and 30C thereupon decide that a fault has occurred in either the GMPLS control unit 30B, or the C-Plane network 40 between the GMPLS control unit 30B or GMPLS control units 30A or 30C. The GMPLS control units 30A and 30C then stop updating path information via the GMPLS control units 30B and start preserving the path information.

When a fault is then detected in the optical data line for IF-1 (606), the optical switching unit 20B switches the path from the currently used path LSP 60B, to the secondary path LSP 60A. More specifically, the optical switching unit 20B sends a switching change instruction via the D-Plane network 50 to the optical switching unit 20A and optical switching unit 20C (607 and 608). After receiving this switching change instruction, the optical switching unit 20A and optical switching unit 20C switch the path from LSP 60B to LSP 60A to recover from the fault.

The optical switching unit 20B notifies the GMPLS control unit 30B that the switch status has been changed (609) but cannot receive a reply because the GMPLS control unit 30B is currently restarting. The optical switching unit 20B therefore decides that some type of fault has occurred in the GMPLS control unit 30B, and sets the internal status to "Hold".

Later, when restarting has been completed (610), the GMPLS control unit 30B sends a switch status enquiry to the optical switching unit 20B (611). The internal status of the optical switching unit 20B at this time is "Hold" status and therefore does not send the switch status after switching to LSP 60A, but instead sends the LSP 60B switch status before the path is switched (612).

The GMPLS control unit 30B starts restoring the path status based on results in the reply on switch status sent by the optical switching unit 20B. The GMPLS control unit 30B then sends a Hello message set with parameter value showing status is currently being restored, to the adjacently connected GMPLS control units 30A and 30C (613 and 615).

After receiving the Hello message, the GMPLS control units 30A and 30C again begin exchanging Hello messages (614 and 616), and send a PATH message containing information needed for restoring status, to the GMPLS control units 30B. In the second embodiment, the upstream GMPLS control unit 30C sends the PATH message to the GMPLS control unit 30B (617).

After receiving the PATH message from the GMPLS control unit 30C, the GMPLS control unit 30B restores the path status, based on the contents in the received message (3702 in FIG. 2). The GMPLS control unit 30B then sends the PATH message to the downstream GMPLS control unit 30A (618).

After receiving the PATH message, the GMPLS control unit 30A sends a RESV message to the GMPLS control unit 30B (3706 in FIGS. 12 and 619) since its own node is the end point (result for 3704 in FIG. 12 is "Yes").

When the RESV message is received, the GMPLS control unit 30B restores the path status (3802 in FIG. 13) based on the contents of the received RESV message, and sends the RESV message to the GMPLS control unit 30C (3805 in FIG. 13, 620). When the GMPLS control unit 30C then receives the RESV message from the GMPLS control unit 30B, it decides that restoration of the path status is complete, stops protecting the path status, and shifts to the normal processing.

When restoring all path states is completed, the GMPLS control unit 30B then sends retrieve instruction to the optical switching unit 20B in order to cancel the hold status (621). The optical switching unit 20B changes to the normal status in compliance with the instructions, and sends an acknowledgement to the GMPLS control unit 30B (622). The normal protection processing procedure is performed next to ensure compatibility (or uniformity) between the GMPLS control unit 30 and the optical switching unit 20.

The process in the second embodiment for changing the path status control table 330 contents in compliance with the above processing procedure is described while referring to a specific example.

FIG. 19A and FIG. 19B are drawings showing the contents of the switching status control table 220A for the optical switch 20B of the second embodiment of this invention. FIG. 19A is the status before detecting the data fault (prior to 606 in FIG. 18). FIG. 19B is the status after detecting the data fault (after 606 in FIG. 18).

FIG. 19A is the state before detecting the data fault so the IF-1 and the IF-2 are connected. The IF state for both the IF-1 and the IF-2 is therefore "In Use". In the state shown in FIG. 15A, communication is performed via the LSP 60B serving as the primary path shown in FIG. 17. Communication on the LSP 60A serving as the secondary path, is performed without being routed through the optical switching unit 20B.

When a fault occurs in the IF-1 here, then the IF-1 state is changed from "In Use" to "In Fault" as shown in FIG. 19B. The optical switching unit 20A then switches the path from LSP 60A to LSP 60B, and the other IF are all changed to "Not Used".

FIG. 20A through FIG. 20D are drawings showing the content of the path status control table 330 for the GMPLS control unit 30A of the second embodiment of this invention.

FIG. 20A shows the path status control table 330 before restarting of the GMPLS control unit 30B (prior to sequence 605 in FIG. 18). No fault has occurred in the IF-1 of optical switching unit 20B before the restarting GMPLS control unit 30B, so the SESSION_B for LSP 60B currently in operation, is stored in the path status control table 330 of optical switching unit 20B as shown in FIG. 20A. More specifically, input IF is set as 1, and the output IF as 2 for SESSION_B.

FIG. 20B is a drawing showing the path status control table 330 that was restored based on the switch status received in response to the inquiry made to optical switching unit 20B (after 612 in FIG. 18).

When restarting has been completed, the GMPLS control unit 30B utilizes the initialization 3501 of The main process 350 of the GMPLS control unit to clear the path status control table 330. The GMPLS control unit 30B then makes an inquiry about the switching status to the optical switching unit 20B (3502 in FIG. 10, 611 in FIG. 18), and receives the switching status from the optical switching unit 20B (612 in FIG. 18). The GMPLS control unit 30B then rewrites the path status control table 330 based on the switch status that was received (3506 in FIG. 10).

At this time, a fault occurs in the IF-1 so the optical switching unit 20B switches the path from the LSP 60B to the LSP 60A (2505 in FIGS. 8, 607 and 608 in FIG. 18). Also, after switching the paths, the optical switching unit 20B cannot receive a reply to the switch status change notification sent to the GMPLS control unit 30B (2506 in FIG. 8, 609 in FIG. 18) so the internal status is at "Hold" (2508 in FIG. 8). Therefore when the GMPLS control unit 30B sent a switch status enquiry to the optical switching unit 20B (611 in FIG. 18), the switch status that is received (612 in FIG. 18) is the switch status before the switch status is updated (2606 in FIG. 9). The switch status actually received by the GMPLS control unit 30B is the switch status shown in FIG. 19A. FIG. 20B is the status reflecting the received switch status.

FIG. 20C shows the path status control table 330 that was restored based on the PATH message sent by the GMPLS control unit 30C (after 617 in FIG. 18).

When the GMPLS control unit 30B sends a Hello message to the GMPLS control unit 30C containing parameters showing that status restoration is in progress (3509 in FIG. 10, 613 in FIG. 18), a PATH message is then received from the GMPLS control unit 30C (3510 in FIG. 10). This received PATH message contains the path status before restarting of the GMPLS control unit in order to follow the usual Graceful Restart procedure. The GMPLS control unit 30B rewrites the path status control table 330 based on this received switch status from the GMPLS control unit restarting (3702 in FIG. 12).

FIG. 20D is a drawing showing the path status control table 330 that was restored based on the RESV message received from the GMPLS control unit 30A (after 619 in FIG. 18).

The GMPLS control unit 30B restores the path status control table 330 based on the RESV message received from the GMPLS control unit 30A. When the above processing is complete, the path status control table 330 is in the status shown in FIG. 20D and matches the contents in FIG. 20A. The invention according to the second embodiment is capable of restoring the path status without conflicts by utilizing Graceful Restart and protection processing the same as in the first embodiment, even if the optical switching unit 20 where the fault occurred is not the termination.

While the present invention has been described in detail and pictorially in the accompanying drawings, the present invention is not limited to such detail but covers various obvious modifications and equivalent arrangements, which fall within the purview of the appended claims.

What is claimed is:

1. A network system comprising at least one set of a path control unit and a data transmission unit coupled to the path control unit,
   wherein a first path control unit sets a path for transmitting data by using a signaling protocol,
   wherein a first data transmission unit coupled to the first path control unit further comprises an input interface for receiving the data and an output interface for outputting the data received by the input interface,
   wherein the first data transmission unit is configured to:
   send the data received by the input interface to an adjacent data transmission unit to which the first data transmission unit is directly coupled via the output interface according to instructions sent from the first path control unit;
   store first path information including a relation between the input interface and the output interface;
   change to second path information upon a fault being detected on the path for transmitting the data;
   store, upon the fault being detected, the first path information prior to being changed upon the fault being detected and the second path information as changed after the fault being detected while the path control unit is restarting,
   send one of the first path information prior to being changed upon the fault being detected and the second path information as changed after the fault being detected to the first path control unit; and
   select which one of the first path information prior to being changed and the second path information as changed after the fault being detected is to be sent to the first path control unit based on an internal state set according to a communication status with the first path control unit, and
   wherein the first path control unit is configured to:
   store the selected path information sent from the first data transmission unit,
   receive the selected path information sent from the first data transmission unit after the first path control unit has restarted in a state where a valid path is set, and
   restore the second path information as changed after the fault being detected to the first path information prior to being changed upon the fault being detected by acquiring path information stored in one or more other path control units that control adjacent data transmission units to which the first data transmission unit is directly coupled.

2. The network system according to claim 1, wherein the internal state is updated upon the first data transmission unit failing to communicate with the first path control unit.

3. The network system according to claim 1, wherein the internal state can take one of a normal state where the first data transmission unit sends the second path information as changed after the fault being detected in the first path control unit and a holding state where the first data transmission unit sends the first path information prior to being changed upon the fault being detected in the first path control unit.

4. The network system according to claim 3, wherein the internal state is updated from the normal state to the holding state upon the first data transmission unit failing to communicate with the first path control unit.

5. The network system according to claim 3, wherein the first path control unit sends instructions to change the internal state to the normal state when the second path information is restored to the first path information prior to being changed upon the fault being detected.

6. A network system comprising:
   a plurality of path control units for setting paths to transmit data by using a signaling protocol, and
   a plurality of data transmission units for transmitting the data according to instructions sent from the path control units,
   wherein a first path control unit of the plurality of path control units controls one or more data transmission units of the plurality of data transmission units, and
   wherein each data transmission unit controlled by the first path control unit comprises an input interface for receiving the data and an output interface for outputting the data received by the input interface,
   wherein each data transmission unit controlled by the first path control unit is configured to:
   send the data received by the input interface to an adjacent data transmission unit to which the first data transmission unit is directly coupled via the output interface of the data transmission unit sending the data according to instructions sent from the first path control unit;
   store first path information including a relation between the input interface and the output interface;
   change to second path information upon a fault being detected on the path for transmitting the data;
   store, upon the fault being detected, the first path information prior to being changed upon the fault being detected and the second path information from after the fault being detected while the path control unit is restarting,
   send one of the first path information prior to being changed upon the fault being detected and the second path information from after the fault being detected to the first path control unit; and
   select which one of the first path information prior to being changed and the second path information from after the fault being detected is to be sent to the first path control unit based on an internal state set according to a communication status with the first path control unit, and wherein the first path control unit is configured to:
store path information for each data transmission unit controlled by the first path control unit,
receive the selected path information sent from each data transmission unit controlled by the first path control unit after the first path control unit has restarted in a state where a valid path is set, and
restore the second path information from after the fault being detected to the first path information prior to being changed upon the fault being detected by acquiring path information stored in one or more other path control units that control adjacent data transmission units to which each data transmission unit controlled by the first path control unit is directly coupled.

7. The network system according to claim 6, wherein the internal state of each data transmission unit controlled by the first path control unit is updated upon the data transmission unit failing to communicate with the first path control unit.

8. The network system according to claim 6, wherein the internal state of each data transmission unit controlled by the first path control unit can take one of a normal state where the data transmission unit sends the second path information from after the fault being detected in the first path control unit and a holding state where the data transmission unit sends the first path information prior to being changed upon the fault being detected in the first path control unit.

9. The network system according to claim 8, wherein the internal state of each data transmission unit controlled by the first path control unit is updated from the normal state to the holding state upon the data transmission unit failing to communicate with the first path control unit.

10. The network system according to claim 8, wherein the first path control unit sends instructions to change the internal state to the normal state when the second path information is restored to the first path information prior to being changed upon the fault being detected.

* * * * *